(12) United States Patent
Musunuri et al.

(10) Patent No.: US 11,049,064 B2
(45) Date of Patent: Jun. 29, 2021

(54) MANAGING WAREHOUSE SPACE CAPACITY AND UTILIZATION USING SELF-ADJUSTING INVENTORY SLOTS

(71) Applicant: Staples, Inc., Framingham, MA (US)

(72) Inventors: Vishal Musunuri, Belmont, MA (US); Michael Bhaskaran, Sherborn, MA (US); Amit Kalra, Acton, MA (US)

(73) Assignee: Staples, Inc., Framingham, MA (US)

( * ) Notice: Subject to any disclaimer, the term of this patent is extended or adjusted under 35 U.S.C. 154(b) by 420 days.

(21) Appl. No.: 15/872,973

(22) Filed: Jan. 16, 2018

(65) Prior Publication Data

US 2019/0220804 A1    Jul. 18, 2019

(51) Int. Cl.
| | | |
|---|---|---|
| G06Q 10/08 | (2012.01) | |
| G06Q 10/06 | (2012.01) | |
| G06K 7/00 | (2006.01) | |
| G06K 19/07 | (2006.01) | |
| B65G 1/10 | (2006.01) | |

(52) U.S. Cl.
CPC ............. *G06Q 10/087* (2013.01); *B65G 1/10* (2013.01)

(58) Field of Classification Search
CPC ................................. G06Q 10/087; B65G 1/10
See application file for complete search history.

(56) References Cited

U.S. PATENT DOCUMENTS

| | | | | |
|---|---|---|---|---|
| 6,918,499 B2 * | 7/2005 | De Land | ................ | A47B 96/04 211/103 |
| 7,246,711 B1 * | 7/2007 | Metcalf | .................. | A47B 45/00 211/106.01 |
| 8,594,835 B2 * | 11/2013 | Lert | ..................... | B65G 1/1371 700/221 |
| 9,418,267 B1 * | 8/2016 | Josey | ..................... | G06Q 10/06 |
| 2004/0055514 A1 * | 3/2004 | De Land | ............... | A47F 5/0018 108/108 |
| 2004/0133483 A1 * | 7/2004 | Potter | .................. | G06Q 10/087 705/28 |

(Continued)

FOREIGN PATENT DOCUMENTS

WO    2017059140 A1    6/2017

OTHER PUBLICATIONS

Arghavani et al., "3D Volumetric Pallet-Loading Optimisation," The International Journal of Advanced Manufacturing Technology, Nov. 1996, vol. 11, Issue 6 (2 pages).

(Continued)

*Primary Examiner* — Talia F Crawley
(74) *Attorney, Agent, or Firm* — VLP Law Group, LLP

(57) ABSTRACT

A technology for managing space utilization using self-adjusting inventory slots is described. In an example embodiment, a system comprises a shelving unit including a shelf, and a shelf adjustment system including an electronic display strip extending parallel with the shelf of the shelving unit. The electronic display strip may display a first visual representation of a first adjustable inventory slot horizontally adjacent to a second visual representation of a second adjustable inventory slot, the first visual representation indicating a first portion of the shelf as the first adjustable inventory slot for a first item, and the second visual representation indicating a second portion of the shelf as the second adjustable inventory slot for a second item.

13 Claims, 13 Drawing Sheets

(56) References Cited

U.S. PATENT DOCUMENTS

| | | | | |
|---|---|---|---|---|
| 2008/0164310 A1* | 7/2008 | Dupuy | .................. | G06Q 30/02 |
| | | | | 235/385 |
| 2013/0048724 A1* | 2/2013 | Burnside | .............. | G07G 1/0054 |
| | | | | 235/385 |
| 2013/0096735 A1* | 4/2013 | Byford | ................ | G05D 1/0234 |
| | | | | 701/2 |
| 2017/0091704 A1* | 3/2017 | Wolf | ...................... | G06Q 50/28 |
| 2018/0365642 A1* | 12/2018 | Bonner | ................ | G06Q 10/087 |
| 2019/0108474 A1* | 4/2019 | Tripathi | ................. | G01B 21/20 |
| 2019/0213212 A1* | 7/2019 | Adato | ................... | G06F 16/235 |

OTHER PUBLICATIONS

Sukhov et al., "A dynamic programming heuristic for optimizing slot sizes in a warehouse," Procedia Computer Science, Information Technology and Quantitative Management, ITQM 2014 (5 pages).

Alonso et al., "Algorithms for Pallet Building and Truck Loading in an Interdepot Transportation Problem," Mathematical Problems in Engineering, 2016 (11 pages).

CubeMaster, Load Plan & Optimization Software, retrieved from http://www.logensol.com/cubemaster/Cargo_Load_Plan_Optimization_Software_overview/ Jul. 26, 2017 (4 pages).

CubeMaster, Palletizing and Packaging Design Software, retrieved from http://www.logensol.com/cubedesigner/Palletizing_Package_Design_Software_overview/ Jul. 26, 2017 (3 pages).

CubeMaster, Load Plan & Optimization Software, Algorithm Multiple Load Optimizations, retrieved from http://www.logensol.com/cubemaster/cargo_load_plan_optimization_software_algorithms/ Jul. 26, 2017 (3 pages).

Packer3D, The Packer3d software calculates optimal plans for loading different types of boxes, cylinders, and pallets Into containers, trucks, and railroad freight cars, retrieved from http://www.packer3d.com/online/pal-by-box Jul. 26, 2017 (1 page).

PalletStacking, Pallet Optimization—Palletization Software, retrieved from http://www.palletstacking.com/ Jul. 26, 2017 (5 pages).

Barry et al., "Warehouse Management System Benefits for Today's Operations," https://www.fcbco.com/blog/warehouse-management-system-benefits, 2018 (12 pages).

\* cited by examiner

MANAGING WAREHOUSE SPACE CAPACITY AND UTILIZATION USING SELF-ADJUSTING INVENTORY SLOTS

BACKGROUND

The present disclosure relates to managing space utilization in a storage facility. In a more particular example, the present disclosure relates to managing space utilization in the storage facility using self-adjusting inventory slots in shelving units.

In conventional storage facilities, the shelving units are divided into multiple slots for storing different types of inventory items. The inventory slots usually have fixed sizes and need to be manually resized by human workers. For example, the human workers need to estimate a new slot size, manually remove the previous marking (e.g., tape), and manually add a new marking for the new inventory slot. Manually resizing the inventory slots is time consuming and often requires a lot of effort, especially in massive storage facilities. Therefore, these inventory slots are typically formed larger than the optimal slot size in order to accommodate larger quantity of items later if needed, and thus avoiding resizing tasks. This existing solution is inflexible and inefficient in utilizing spaces, because it is incapable of dynamically allocating and adjusting the inventory slots according to the quantity of items to be stored therein. Further, due to the inflexibly of many conventional shelving units, a shelf of a shelving unit may be limited to having two or three slots (often a maximum of four) on a standard 4 foot shelf due to the amount of manual work it can take to constantly relabel shelves and/or reconfiguring shelving.

SUMMARY

According to one innovative aspect of the subject matter described in this disclosure, a system includes a shelving unit including a shelf; and a shelf adjustment system including an electronic display strip extending parallel with the shelf of the shelving unit, the electronic display strip displaying a first visual representation of a first adjustable inventory slot horizontally adjacent to a second visual representation of a second adjustable inventory slot, the first visual representation indicating a first portion of the shelf as the first adjustable inventory slot for a first item, and the second visual representation indicating a second portion of the shelf as the second adjustable inventory slot for a second item.

In general, another innovative aspect of the subject matter described in this disclosure may be embodied in methods that include the operations described in reference to the system above. In some embodiments, a method includes activating an electronic display strip extending parallel with a shelf of a shelving unit; and displaying, on the electronic display strip, a first visual representation of a first adjustable inventory slot horizontally adjacent to a second visual representation of a second adjustable inventory slot, the first visual representation indicating a first portion of the shelf as the first adjustable inventory slot for a first item, and the second visual representation indicating a second portion of the shelf as the second adjustable inventory slot for a second item In general, another innovative aspect of the subject matter described in this disclosure may be embodied in a system that includes one or more processors; one or more data storages communicatively coupled to the one or more processors; and one or more memories storing instructions that, when executed by the one or more processors, cause the system to: activate an electronic display strip extending parallel with a shelf of a shelving unit, and display, on the electronic display strip, a first visual representation of a first adjustable inventory slot horizontally adjacent to a second visual representation of a second adjustable inventory slot, the first visual representation indicating a first portion of the shelf as the first adjustable inventory slot for a first item, and the second visual representation indicating a second portion of the shelf as the second adjustable inventory slot for a second.

These and other embodiments may each optionally include one or more of the following features, such as: that the electronic display strip extends from a first point proximate to a first end of the shelf to a second point proximate to a second end of the shelf, the first visual representation extends from a first end of the first adjustable inventory slot to a second end of the first adjustable inventory slot, and the second visual representation extends from a first end of the second adjustable inventory slot to a second end of the second adjustable inventory slot; that an inventory control system electronically coupled to the electronic display strip that adjusts, on the electronic display strip, one or more of a horizontal dimension of the first visual representation to adjust a slot width of the first adjustable inventory slot and a horizontal dimension of the second visual representation to adjust a slot width of the second adjustable inventory slot; that the shelf adjustment system includes one or more shelf actuators configured to vertically position the shelf of the shelving unit, the inventory control system is electronically coupled to the one or more shelf actuators, and the inventory control system actuates the one or more shelf actuators to vertically position the shelf using a slot height of the first adjustable inventory slot and the second adjustable inventory slot; that a data storage communicatively coupled to the inventory control system for storing data and providing access to the data to the inventory control system, wherein the inventory control system is operable to: determine a first quantity of the first item to be stocked in the first adjustable inventory slot and a second quantity of the second item to be stocked in the second adjustable inventory slot, determine first item dimensions of the first item and second item dimensions of the second item, calculate a slot width and a slot height for the first adjustable inventory slot based on the first quantity of the first item and the first item dimensions, calculate a slot width and a slot height for the second adjustable inventory slot based on the second quantity of the second item and the second item dimensions, and store, in the data storage, the slot width and the slot height of the first adjustable inventory slot and the slot width and the slot height of the second adjustable inventory slot; that the inventory control system is operable to: allocate the first adjustable inventory slot to the first item in the data storage, and allocate the second adjustable inventory slot to the second item in the data storage; that to allocate the first adjustable inventory slot to the first item in the data storage includes associating a product identifier of the first item with a slot identifier of the first adjustable inventory slot, and to allocate the second adjustable inventory slot to the second item in the data storage includes associating a product identifier of the second item with a slot identifier of the second adjustable inventory slot; that the inventory control system is operable to: receive an input that identifies the first item, retrieve, from the data storage, allocation data indicating the first adjustable inventory slot allocated to the first item, the allocation data including a shelving location indicating a location of the shelving unit that includes the shelf having the first adjustable inventory slot from among a plurality of shelves in a storage facility, and provide the shelving location indicating the location of the shelving unit that includes the shelf having the first adjustable inventory slot; that the inventory control system is operable to: receive an input that identifies the first item, retrieve, from the data storage, allocation data indicating the first adjustable inventory slot allocated to the first item, the allocation data including a shelving location indicating a location of the shelving unit that includes the shelf having the first adjustable inventory slot from among a plurality of shelves in a storage facility, and instruct an autonomous vehicle to transport the first quantity of the first item to the shelving location for stocking in the first adjustable inventory slot represented by the first visual representation on the electronic display strip; that the inventory control system is operable to update the first visual representation displayed on the electronic display strip to include a unique machine-readable symbol identifying the first item and item information describing the first item; that the item information describing the first item displayed by the first visual representation on the electronic display strip includes one or more of an item name of the first item, a picking instruction of the first item, and the first quantity of the first item to be stocked in the first adjustable inventory slot; that a second shelf that has a second electronic display strip extending parallel with the second shelf and one or more second shelf actuators configured to vertically position the second shelf, the shelf includes a first unallocated portion indicated by a third visual representation on the electronic display strip, the second shelf includes a second unallocated portion indicated by a fourth visual representation on the second electronic display strip, the inventory control system is operable to: determine a third quantity of a third item to be stocked in a third adjustable inventory slot and third item dimensions of the third item, calculate a slot width and a slot height for the third adjustable inventory slot based on the third quantity of the first item and the third item dimensions, and select, from the first unallocated portion and the second unallocated portion, a third portion to form the third adjustable inventory slot based on the slot width and the slot height of the third adjustable inventory slot; and that the inventory control system is operable to: adjust, on the corresponding electronic display strip, a horizontal dimension of the corresponding visual representation that indicates the third portion using the slot width of the third adjustable inventory slot, and actuate the one or more corresponding shelf actuators to vertically position the corresponding shelf that includes the third portion using the slot height of the third adjustable inventory slot.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

The technology presented in this disclosure addresses the problems discussed in the Background Section. For example, the technology described herein optimizes the space utilization in the storage facility in an efficient and flexible manner. In particular, the present technology may calculate a slot size for an adjustable inventory slot, identify an unallocated portion in a shelf among multiple shelving units of the storage facility, and automatically adjust the unallocated portion to form the adjustable inventory slot that can sufficiently and effectively accommodate the quantity of the inventory item. The present technology can also facilitate the human workers in completing their tasks by preparing the adjustable inventory slots in advance, and providing shelving locations of the adjustable inventory slots for stocking the corresponding inventory items when required. This implementation is particularly advantageous because it eliminates the need for the human worker to manually find an available inventory slot, estimate the slot size of that inventory slot, and subjectively decide whether that inventory slot is sufficient to stock the quantity of the inventory item. The present technology is also applicable to automated storage facilities in which the tasks of stocking items are performed by automated vehicles, e.g., warehouse robotic machines.

Figure 1:
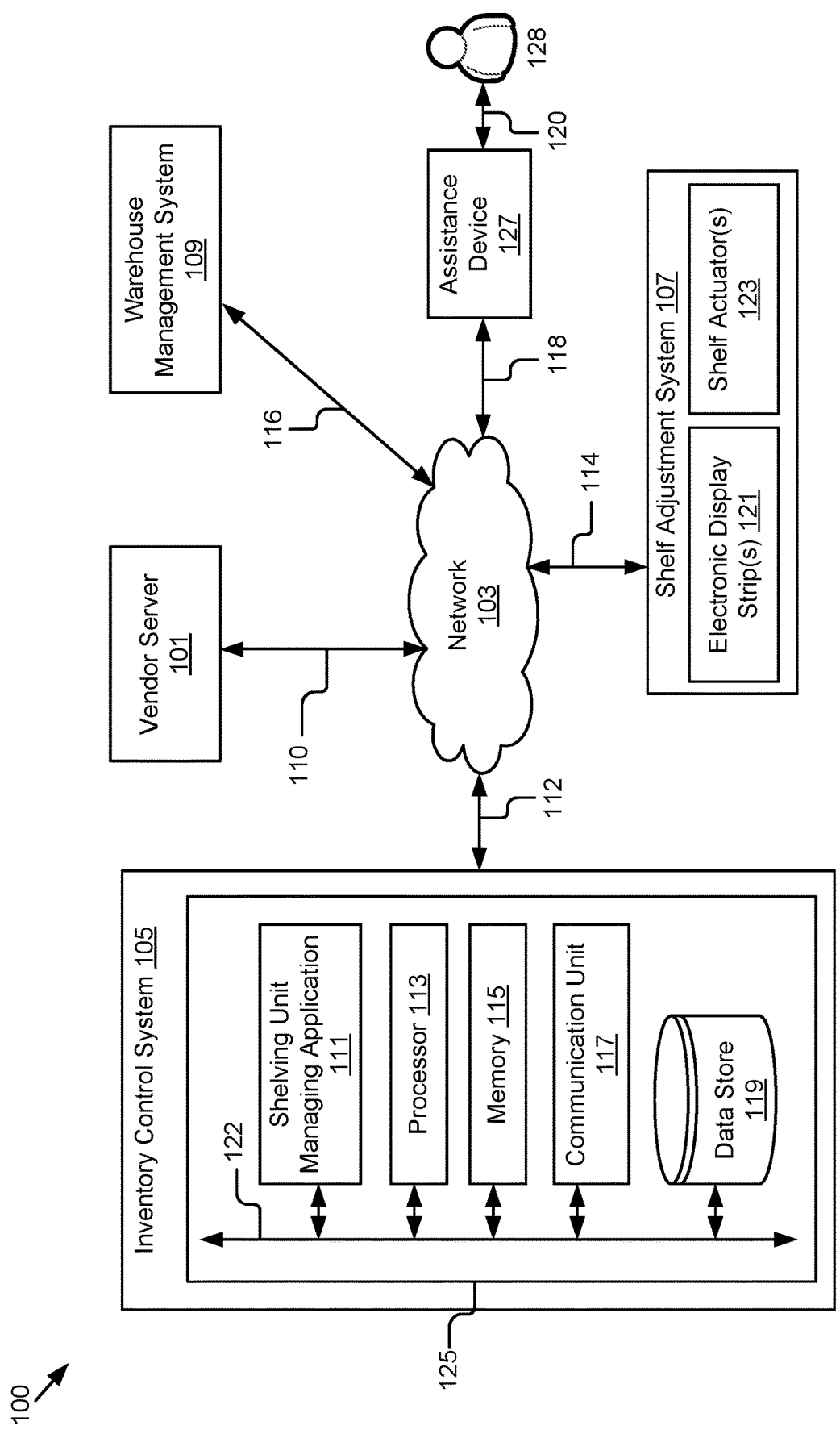
FIG. 1 is a block diagram of an example system for managing space utilization using adjustable inventory slots.

FIG. 1 is a block diagram of an example system 100 for managing space utilization using adjustable inventory slots in shelving units. As shown, the system 100 includes a vendor server 101, a warehouse management system 109, an inventory control system 105, a shelf adjustment system 107, and an assistance device 127 coupled for electronic communication via a network 103. It should be understood that the system 100 depicted in FIG. 1 is provided by way of example and the system 100 and/or further systems contemplated by the present disclosure may include additional and/or fewer components, may combine components and/or divide one or more of the components into additional components, etc. For example, the system 100 may include any number of vendor servers 101, warehouse management systems 109, inventory control systems 105, shelf adjustment systems 107, or assistance devices 127.

The network 103 can be a conventional type, wired or wireless, and may have numerous different configurations including a star configuration, token ring configuration, or other configurations. Furthermore, the network 103 may include one or more local area networks (LAN), wide area networks (WAN) (e.g., the Internet), cellular networks, public networks, private networks, virtual networks, virtual private networks, peer-to-peer networks, close or micro proximity networks (e.g., Bluetooth, NFC, etc.), and/or other interconnected data paths across which multiple devices may communicate.

The network 103 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, or other suitable networks. Although FIG. 1 illustrates a single block for the network 103 that couples to the vendor server 101, the warehouse management system 109, the inventory control system 105, the shelf adjustment system 107, and the assistance device 127, it should be understood that the network 103 may in practice comprise any number of combination of networks, as noted above.

The vendor server 101 may include a hardware and/or virtual server that includes processor(s), memory(ies), and network communication capabilities (e.g., communication unit(s)). The vendor server 101 may be communicatively coupled to the network 103, as reflected by signal line 110. In some embodiments, the vendor server 101 may send and receive data to and from one or more warehouse management systems 109 and/or any other components of the system 100. For example, the vendor server 101 may receive purchase orders of inventory from the warehouse management system 109. In another example, the vendor server 101 may send an invitation for delivery appointment to the warehouse management system 109 to schedule an appointment for delivering the ordered inventory.

The warehouse management system (WMS) 109 can manage a variety of tasks to support and/or control operations of a storage facility. In some embodiments, the WMS 109 may include a hardware and/or virtual server that includes processor(s), memory(ies), and network communication capabilities (e.g., communication unit(s)). The WMS 109 may be communicatively coupled to the network 103, as reflected by signal line 116. In some embodiments, the WMS 109 may send and receive data to and from other components of the system 100. For example, the WMS 109 may keep track of the inventory level of a stock keeping unit (SKU) and send a purchase order to the vendor server 101 when the inventory level is low. In another example, the WMS 109 may receive the order confirmation of the purchase order and the invitation for delivery appointment from the vendor server 101. The WMS 109 may send the information of the delivery appointment to the inventory control system 105 to prepare in advance one or more adjustable inventory slots for stocking the ordered inventory when it is delivered. In some embodiments, the WMS 109 may generate statistics of inventory level and prediction of demand for various inventory items stored in the storage facility.

The shelf adjustment system 107 may include one or more electronic display strips 121 and one or more shelf actuators 123 provided for the shelving units in the storage facility. The electronic display strip 121 and the shelf actuator 123 may be communicatively coupled to the network 103 to send and receive data to and from the inventory control system 105 and/or any other components of the system 100, as reflected by signal line 114. For example, the electronic display strip 121 may receive a slot width from the inventory control system 105 via the network 103 to display a corresponding visual representation of an adjustable inventory slot. In another example, the shelf actuator 123 may receive a slot height from the inventory control system 105 via the network 103 to position the shelf accordingly. In some embodiments, the electronic display strips 121 may be Light Emitting Diode (LED) strips, Liquid Crystal Display (LCD) strips, or any combination thereof. The shelf actuator 123 may be pneumatic actuators. Other examples of the electronic display strips 121 and the shelf actuators 123 are also possible and contemplated.

Figure 10:
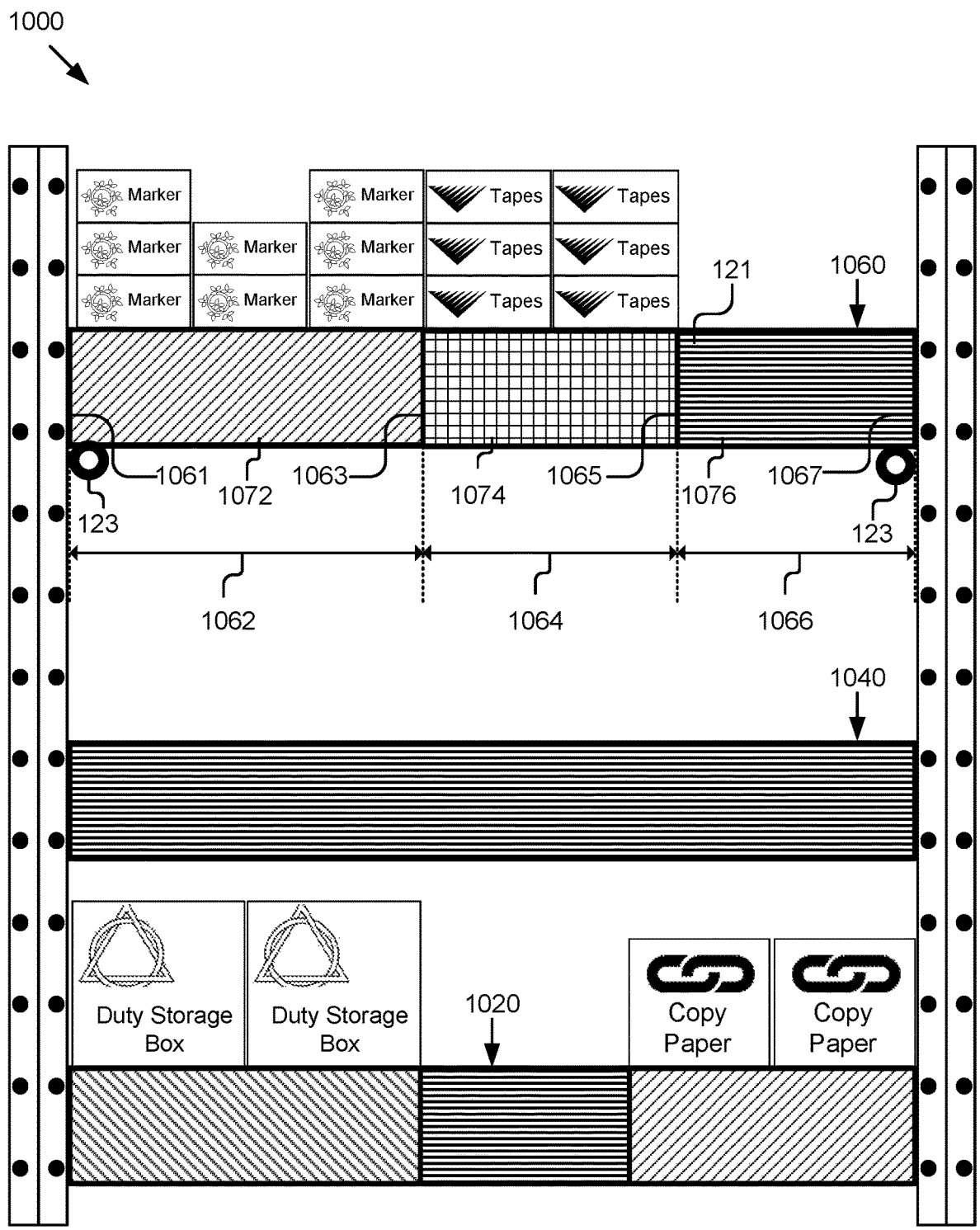
FIG. 10 illustrates an example of a shelving unit.

A shelving unit 1000 equipped with the electronic display strips 121 and the shelf actuators 123 is illustrated in FIG. 10. As shown, the shelving unit 1000 includes a shelf 1020, a shelf 1040, and a shelf 1060. Each shelf of the shelving unit 1000 may include an electronic display strip 121 extending parallel with the shelf and one or more shelf actuators 123 for positioning the shelf vertically. For example, the shelf 1060 may include the electronic display strip 121 in the front of the shelf 1060 and extending from a first point proximate to the first end 1061 to a second point proximate to the second end 1067 of the shelf 1060. In some embodiments, a particular point is considered proximate to one end of a shelf if the margin from the particular point to the end of the shelf satisfies a threshold distance (e.g., less than 0.5 cm).

In some embodiments, the electronic display strip 121 may display multiple visual representations, each visual representation may indicate a portion of the shelf as an adjustable inventory slot for an inventory item, or as an unallocated portion not yet assigned to any inventory item. In some embodiments, the electronic display strip 121 may be electronically coupled to the inventory control system 105 to adjust the horizontal dimension of the visual representations on the electronic display strip 121, thereby adjusting the slot widths of the adjustable inventory slots indicated by the visual representations. In this present disclosure, the adjustable inventory slot may be referred to as the self-adjusting inventory slot, because its slot size (e.g., the slot width and the slot height) can be advantageously adjusted by the inventory control system 105 without intervention by the human workers.

In some embodiments, the visual representations may be displayed with visually distinguishable patterns. In some embodiments, the visual representation may be displayed with information of the inventory item to be stocked in the adjustable inventory slot indicated by the visual representation. As illustrated in FIG. 10, the electronic display strip 121 displays a visual representation 1072 indicating a first portion of the shelf 1060 as a first adjustable inventory slot 1062 for item "markers," a visual representation 1074 indicating a second portion of the shelf 1060 as a second adjustable inventory slot 1064 for item "tapes," and a visual representation 1076 indicating a third portion of the shelf 1060 as an unallocated portion 1066. The unallocated portion 1066 may be used to form a third adjustable inventory slot for stocking another product, as described elsewhere herein.

In some embodiments, the visual representations may be displayed directly adjacent to each other along the horizontal direction of the shelf. Each visual representation may extend from a first end to a second end of the adjustable inventory slot indicated by the visual representation. For example, the visual representation 1072 extends from the first end 1061 to the second end 1063 of the adjustable inventory slot 1062. The visual representation 1074 extends from the first end 1063 to the second end 1065 of the adjustable inventory slot 1064. The visual representation 1076 extends from the first end 1065 to the second end 1067 of the unallocated portion 1066. As depicted, the visual representation 1072 of the adjustable inventory slot 1062 is horizontally adjacent to visual representation 1074 of the adjustable inventory slot 1064, and the visual representation 1074 of the adjustable inventory slot 1064 is horizontally adjacent to the visual representation 1076 of the unallocated portion 1066.

In some embodiments, the shelf actuator 123 may be electronically coupled to the inventory control system 105 to vertically position the shelf, thereby adjusting the slot height of the adjustable inventory slots included in the shelf. For example, the shelf 1060 may be provided with one shelf actuator 123 in each corner of the shelf. These shelf actuators 123 may be coupled to each other to collaboratively move the shelf 1060 up or down (together with the inventory stocked on the shelf 1060, if any) as actuated by the inventory control system 105. In some embodiments, all the shelves of the shelving unit may be vertically adjustable. In other embodiments, only the shelves in the middle of the shelving unit (e.g., the shelf 1040) may be vertically adjustable, while the top shelf (e.g., the shelf 1060) and/or the bottom shelf (e.g., the shelf 1020) of the shelving unit may not.

The assistance device 127 is a computing device that includes one or more sensors, a memory, a processor, and a communication unit. The assistance device 127 may be coupled to the network 103, as reflected by signal line 118, to send and receive data to and from the warehouse management system 109, the inventory control system 105, and/or any other components of the system 100. Non-limiting examples of the assistance device 127 include barcode scanners, laptop computers, a desktop computers, a tablet computers, a holographic computers, alternate and/or augmented reality devices (e.g., Microsoft HoloLens™, Google Glass™, Oculus™, etc.), mobile phones, personal digital assistants (PDA), or any other electronic devices capable of capturing and/or entering input data, and providing the input data to other components of the system 100. The human worker 128 can interact with the assistance device 127 to enter the input data and/or receiving assistance information, as illustrated by signal line 120. For instance, the human worker 128 can wear a wearable augmented reality device, such as a Microsoft HoloLens™, which may overlay information about inventory and may receive input via input devices, such as a hardware button, an optical sensor (e.g., camera, etc.). The assistance device 127 may capture inputs such as keyboarding and/or pointer device inputs, gestures, voice commands, etc. Examples of the input data include, but are not limited to product identifier (e.g., obtained by scanning a barcode of inventory item), slot identifier (e.g., obtained by scanning a barcode of adjustable inventory slot), quantity of items, delivery condition (good, damaged, broken seal), etc. Examples of the assistance information include, but are not limited to shelving location, arrangement pattern of inventory items, etc. Although one assistance device 127 is illustrated in FIG. 1, the system 100 can include any number of assistance devices 127.

The inventory control system 105 can manage the storage of inventory items in multiple shelving units of the storage facility. In some embodiments, the inventory control system 105 may include computing device(s) 125 that have a shelving unit managing application 111, processor(s) 113, memory(ies) 115, communication unit(s) 117, and data store(s) 119. The inventory control system 105 may be coupled to the network 103 via the signal line 112, and may send and receive data to and from the shelf adjustment system 107, the WMS 109, the assistance device 127, and/or any other components of the system 100.

The processor 113 may execute software instructions by performing various input, logical, and/or mathematical operations. The processor 113 may have various computing architectures to method data signals including, for example, a complex instruction set computer (CISC) architecture, a reduced instruction set computer (RISC) architecture, and/or an architecture implementing a combination of instruction sets. The processor 113, which may include one or more processors, may be physical and/or virtual, and may include a single core or plurality of processing units and/or cores. In some embodiments, the processor 113 may be capable of generating and providing electronic signals to the electronic display strips 121 and the shelf actuators 123, performing complex tasks such as inventory slot monitoring and adjustment, etc. In some embodiments, the processor 113 may be coupled to the memory 115 via the bus 122 to access data and instructions therefrom and store data therein. The bus 122 may couple the processor 113 to the other components of the computing device 125 including, for example, the shelving unit managing application 111, the memory 115, the communication unit 117, and the data store 119.

The memory 115 may store and provide access to data to the other components of the computing device 125. The memory 115 may be included in a single computing device or a plurality of computing devices. In some embodiments, the memory 115 may store instructions and/or data that may be executed by the processor 113. For example, the memory 115 may store the shelving unit managing application 111 and/or its respective components, depending on the configuration. The memory 115 is also capable of storing other instructions and data, including, for example, an operating system, hardware drivers, other software applications, databases, etc. The memory 115 may be coupled to the bus 122 for communication with the processor 113 and the other components of computing device 125.

The memory 115 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 113. In some embodiments, the memory 115 may include one or more of volatile memory and non-volatile memory (e.g., RAM, ROM, hard disk, optical disk, etc.). It should be understood that the memory 115 may be a single device or may include multiple types of devices and configurations.

The bus 122 can include a communication bus for transferring data between components of a computing device or between computing devices, a network bus system including a network or portions thereof, a processor mesh, a combination thereof, etc. In some embodiments, various other components operating on the computing device 125 (operating systems, device drivers, etc.) may cooperate and communicate via a communication mechanism included in or implemented in association with the bus 122. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 117 may include one or more interface devices (I/F) for wired and wireless connectivity among the components the system 100. For example, the communication unit 117 may include, but is not limited to, various types known connectivity and interface options. The communication unit 117 may be coupled to the other components of the computing device 125 via the bus 122. The communication unit 117 may be coupled to the network 103, as reflected by the signal line 112, depending on the configuration. In some embodiments, the communication unit 117 can link the processor 113 to a network (e.g., the Internet, an intranet, etc.), which may in turn be coupled to other processing systems. The communication unit 117 can provide other connections to a network and to servers or computing devices using various standard communication protocols.

The data store 119 includes a non-transitory storage medium that stores various types of data and provides access to the data. The data stored by the data store 119 may be organized and queried using various criteria. For example, the data store 119 may include data tables, databases, or other organized collections of data. In some embodiments, the data store 119 may be included in the computing device 125 or in another computing system and/or storage system distinct from but coupled to or accessible by the computing device 125. In some embodiments, the data store 119 may be incorporated with the memory 115 or may be distinct therefrom. In some embodiments, the data store 119 may store data associated with a database management system (DBMS) operable on the computing device 125. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the data store 119 may include, but is not limited to, product data, shelf data, slot data, allocation data, etc. In some embodiments, the product data may include information describing inventory items. For example, for each inventory item, the product data may include a product identifier (ID) uniquely identifying the item (e.g., product barcode, product Quick Respond (QR) code, etc.), a product name of the item (e.g., duty storage box FGH, copy paper GHJ, etc.), a picking instruction of the item (e.g., each, case, etc.), statistics on inventory level of the inventory item over time, etc. In some embodiments, the shelf data may include information describing shelves of the shelving units. For example, for each shelf, the shelf data may include a shelf ID uniquely identifying the shelf, a shelving unit ID uniquely identifying the shelving unit that includes the shelf, a shelf width, a shelf length, a shelf height (from the ground), a vertical distance from the shelf to the shelf directly above, a strip ID uniquely identifying the electronic display strip extending parallel with the shelf, an actuator ID(s) uniquely identifying the shelf actuator(s) that vertically position the shelf.

In some embodiments, the slot data may include information describing adjustable inventory slots and unallocated portions included in the shelves of the shelving units. For example, for each adjustable inventory slot or unallocated portion, the slot data may include a slot ID uniquely identifying the adjustable inventory slot or the unallocated portion (e.g., slot barcode, slot QR code, etc.), a shelving location of the adjustable inventory slot (shelving unit ID and shelf ID of the shelf including the adjustable inventory slot, distance from the start point of the adjustable inventory slot to a point of reference associated with the shelf, e.g., first end of the shelf), a slot width, a slot height, a slot type (inventory slot or unallocated portion), etc. In some embodiments, if the slot type is "inventory slot," the slot data may also include the quantity of items accommodatable by the adjustable inventory slot (also referred to herein as the quantity of items to be stocked in the adjustable inventory slot) and the quantity of items currently stocked in the adjustable inventory slot. In some embodiments, the allocation data may include information describing slot-item allocations that associate an adjustable inventory slot with an inventory item. For example, for each slot-item allocation, the allocation data may include the slot ID of the adjustable inventory slot and the product ID of the inventory item allocated to the adjustable inventory slot. In some embodiments, the allocation data may also include the shelving location of the adjustable inventory slot.

The shelving unit managing application 111 is computer logic executable to manage space utilization of multiple shelving units in the storage facility. In some embodiments, the shelving unit managing application 111 may calculate a slot width and a slot height for a first adjustable inventory slot, determine a first portion of a shelf to form the first adjustable inventory slot, adjust the first portion using the slot width and the slot height of the first adjustable inventory slot, and allocate the first adjustable inventory slot to a first item. In some embodiments, the shelving unit managing application 111 can be implemented using software executable by one or more processors of one or more computer devices, using hardware, such as but not limited to a field-programmable gate array (FPGA), an application-specific integrated circuit (ASIC), etc., and/or a combination of hardware and software, etc. The shelving unit managing application 111 may receive and process the input data, the slot data, etc., communicate with other elements of the computing device 125 via the bus 122, and communicate with other components of the system 100 via the network 103. The shelving unit managing application 111 is described in details below with reference to at least FIGS. 2-11E.

Figure 2:
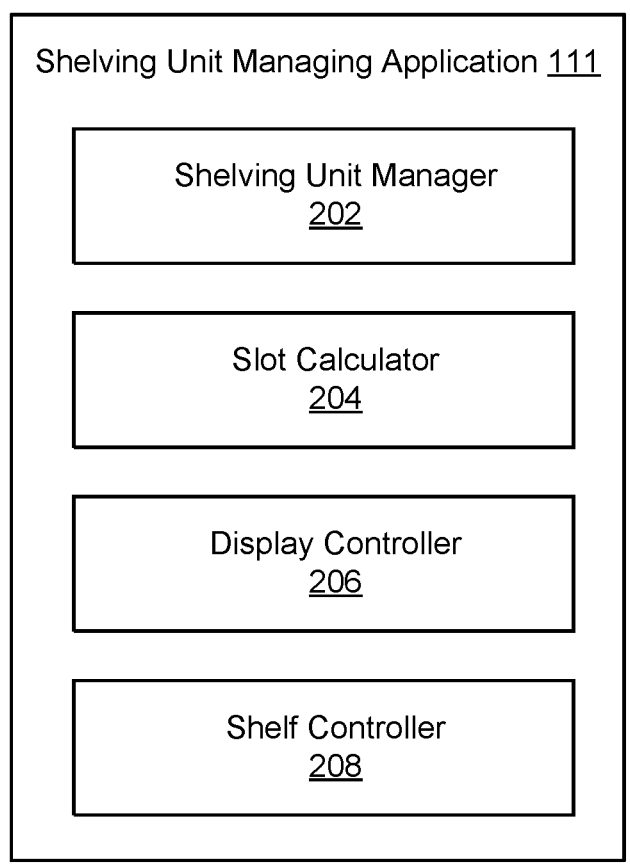
FIG. 2 is a block diagram of a shelving unit managing application.

FIG. 2 is a block diagram of an example shelving unit managing application 111. As depicted, the shelving unit managing application 111 may include a shelving unit manager 202, a slot calculator 204, a display controller 206, and a shelf controller 208. It should be understood that the shelving unit managing application 111 may include additional components such as, but not limited to, a configuration engine, an encryption engine, etc., and/or these various components may be combined into a single engine or divided into additional engines.

The shelving unit manager 202, the slot calculator 204, the display controller 206, and the shelf controller 208 may be implemented as software, hardware, or a combination of the foregoing. In some embodiments, shelving unit manager 202, the slot calculator 204, the display controller 206, and the shelf controller 208 may be communicatively coupled by the bus 122 and/or the processor 113 to one another and/or the other components of the computing device 125. In some embodiments, one or more of the components 111, 202, 204, 206, and/or 208 are sets of instructions executable by the processor 113 to provide their functionality. In further embodiments, one or more of the components 111, 202, 204, 206, and/or 208 are storable in the memory 115 and are accessible and executable by the processor 113 to provide their functionality. In any of the foregoing embodiments, these components 111, 202, 204, 206, and/or 208 may be adapted for cooperation and communication with the processor 113 and other components of the computing device 125. The shelving unit managing application 111, and its components 202, 204, 206, 208, 210, and 212 are described in further detail below with reference to at least FIGS. 3-11E.

Figure 3:
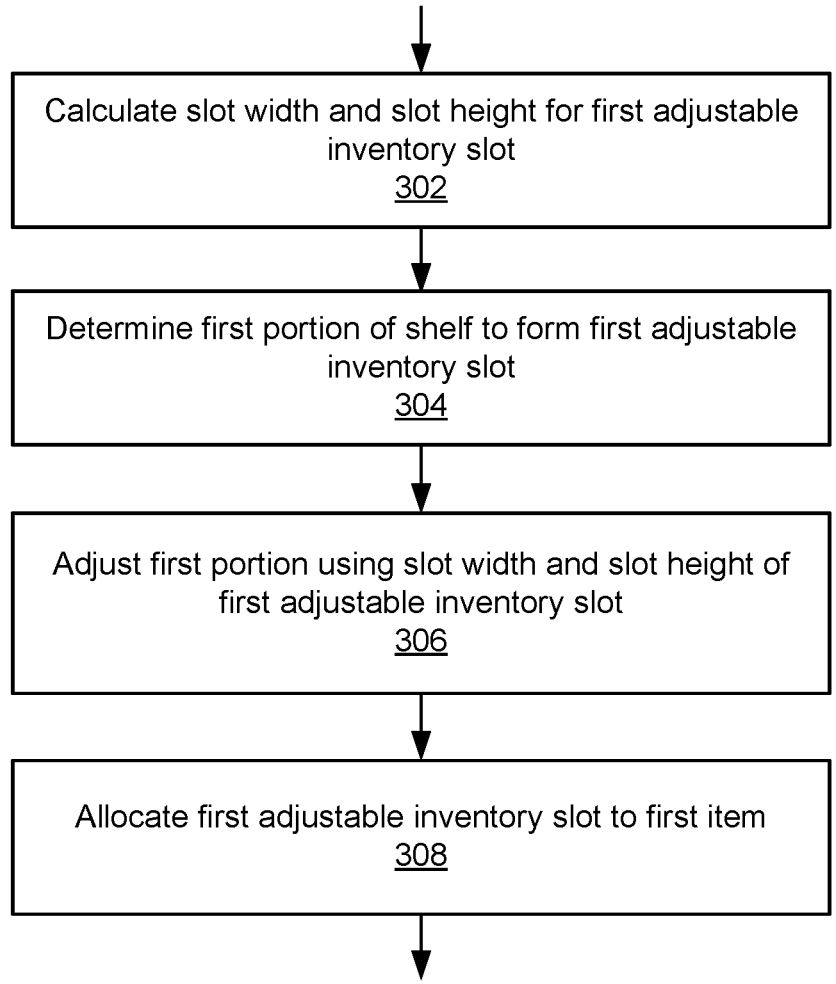
FIG. 3 is a flowchart of an example method for adjusting an adjustable inventory slot.
Figure 4:
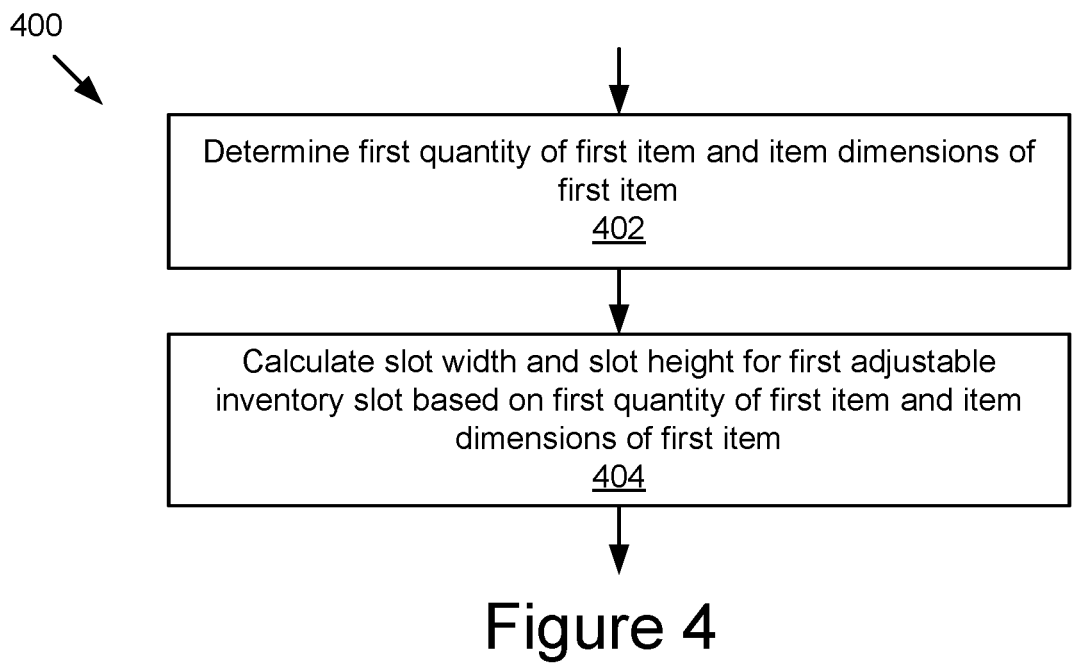
FIG. 4 is a flowchart of an example method for calculating a slot width and a slot height for the adjustable inventory slot.

FIG. 3 is a flowchart of an example method 300 for adjusting an adjustable inventory slot. In block 302, the slot calculator 204 may calculate a slot width and a slot height for a first adjustable inventory slot. A flowchart of an example method 400 for calculating the slot width and the slot height for the first adjustable inventory slot is illustrated in FIG. 4. In block 402, the slot calculator 204 may determine a first quantity of a first item and item dimensions of the first item. In some embodiments, the first quantity of the first item may be the quantity of the first items to be stored in the first adjustable inventory slot and may be determined based on purchase order information, statistics of inventory level, prediction of demand, etc. associated with the first item.

As an example, the slot calculator 204 may extract product information (e.g., product ID), a delivery quantity (e.g., 5,000 items), a delivery date, etc. of the first item from the order confirmation of the purchase order. In this example, the statistics on inventory level of the first item may indicate that the first item generally needs to be replenished in the active area every four days, and the prediction of demand may indicate that the demand for the first item potentially increases by 20% during holiday season. As a result, the slot calculator 204 may determine to stock 70% of the delivery quantity of the first item in the active area (e.g., 3,500 items) and 30% of the delivery quantity of the first item in the reserve area (e.g., 1,500 items). The first items in the reserve area may be used to replenish the first items in the active area when needed. Thus, the slot calculator 204 may determine to form the first adjustable inventory slot for the first item in the active area, with the first quantity of the first item to be stocked in the first adjustable inventory slot is 3,500 items. Additionally, the slot calculator 204 may determine to form another adjustable inventory slot for the first item in the reserve area, with the first quantity of the first item to be stocked in that adjustable inventory slot is 1,500 items.

In some embodiments, the item dimensions of the first item may indicate the measurements of the first item. For example, if the first item has a rectangular shape (e.g., staples box), the item dimensions may include the width, length, and height of the first item. If the first item has a circular shape (e.g., soccer ball), the item dimensions may include the diameter of the first item. In some embodiments, if the first item does not have a rectangular shape, the slot calculator 204 may determine the item dimensions to be the width, length, and height of a rectangular box that the first item can fit in.

In block 404, the slot calculator 204 may calculate a slot width and a slot height for the first adjustable inventory slot based on the first quantity of the first item and the item dimensions of the first item. In particular, the slot calculator 204 may determine an arrangement pattern to place the first quantity of the first item in the first adjustable inventory slot. The slot calculator 204 may use the item dimensions of each first item to calculate the amount of space occupied by the first quantity of the first item as the first quantity of the first item is organized according to the arrangement pattern. With an assumption that the first adjustable inventory slot substantially covers the shelf width of the shelf, the slot calculator 204 may then calculate the slot width and the slot height for the first adjustable inventory slot to provide the amount of space for accommodating the first quantity of the first item. The slot calculator 204 may store the slot width and the slot height of the first adjustable inventory slot and/or the arrangement pattern in the data store 119.

Unlike the existing solutions described in the Background, the technology described herein can advantageously divide a shelf into more slots than those existing solutions. For instance, the slot calculator 204 may determine 5, 6, 7, 8+ slots for a standard four foot shelf which the shelving unit manger 202 can use to provision the slots (e.g., by cooperating with the display controller to conveniently and automatically mark the shelf front using the techniques described herein at minimal expense). The slots could have a uniform widths (e.g., six inches across a four, six, eight, etc., foot shelf), or may have varying widths (e.g., six inches, four inches, 12 inches, etc., across). The sizes of the slots and shelves may vary upon application any suitable sizes may be used and are contemplated, as discussed elsewhere herein.

In some embodiments, the slot calculator 204 may compute multiple candidate pairs of the slot width and the slot height for the first adjustable inventory slot. In some embodiments, the slot calculator 204 may select one pair of the slot width and the slot height for the first adjustable inventory slot from the multiple candidate pairs based on one or more criteria. For example, the slot calculator 204 may select the candidate pair of the slot width and the slot height that has the smallest slot height, thus making it easier to later vertically position the shelf with the first items stacked up in the first adjustable inventory slot. In another example, the slot calculator 204 may retrieve the slot width and the slot height of multiple unallocated portions from the data store 119. The slot calculator 204 may then select the candidate pair of the slot width and the slot height that are no larger than the slot width and the slot height of a particular unallocated portion among the multiple allocated portions. This implementation is particularly advantageous because it avoids vertical adjustment of one or more shelves when the particular unallocated portion is adjusted to form the first adjustable inventory slot.

Figure 5:
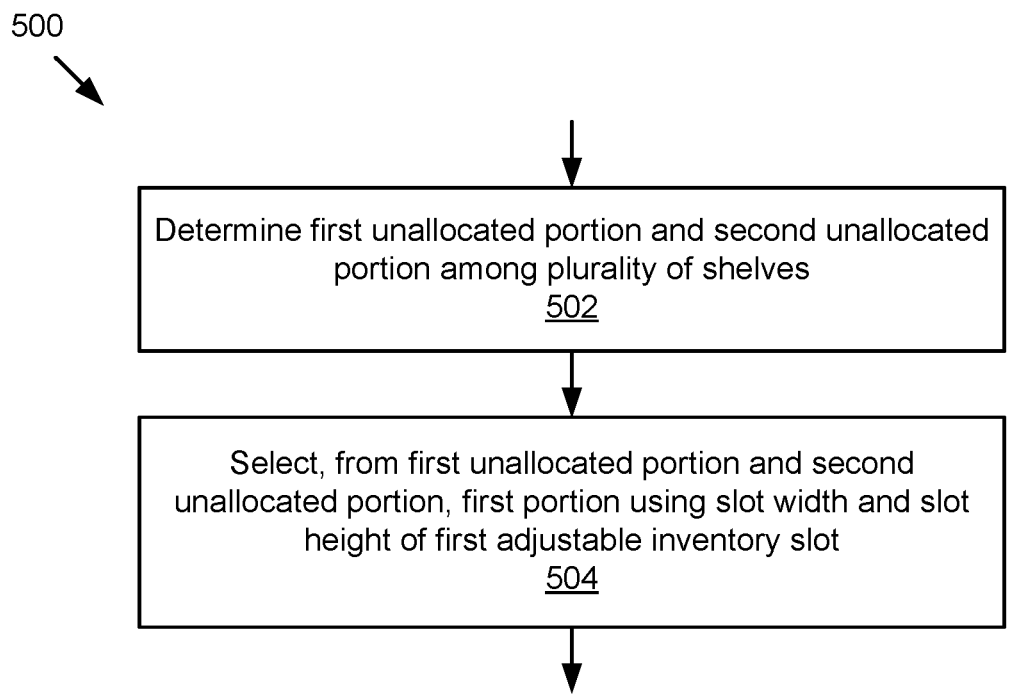
FIG. 5 is a flowchart of an example method for determining an unallocated portion of a shelf.

Referring back to FIG. 3, in block 304, the shelving unit manager 202 may determine a first portion of a shelf to form the first adjustable inventory slot. A flowchart of an example method 500 for determining the first portion of the shelf is illustrated in FIG. 5. In block 502, the shelving unit manager 202 may determine a first unallocated portion and a second unallocated portion among a plurality of shelves of the shelving units in the storage facility. The first unallocated portion and the second unallocated portion may be included in the same shelf or in different shelves. Each unallocated portion may be a portion of a shelf that is not yet allocated to any inventory item, and thus available for stocking inventory. In some embodiments, the shelving unit manager 202 may determine the unallocated portions based on the slot data in the data store 119. For example, the shelving unit manager 202 may determine the shelf portions having the slot type of "unallocated portion" in the slot data to be the unallocated portions.

In block 504, the shelving unit manager 202 may select a first portion to form the first adjustable inventory slot from the first unallocated portion and the second unallocated portion. The first portion may be selected using the slot width and the slot height of the first adjustable inventory slot. In some embodiments, the shelving unit manager 202 may retrieve the slot width and the slot height of the first unallocated portion and the second unallocated portion from the data store 119. The shelving unit manager 202 may select the unallocated portion having the slot width and the slot height that respectively satisfy the slot width and the slot height of the first adjustable inventory slot to be the first portion. For example, the shelving unit manager 202 may select the second unallocated portion to be the first portion to form the first adjustable inventory slot, because the slot width and the slot height of the second unallocated portion are larger than the slot width and the slot height of the first adjustable inventory slot.

In some embodiments, the shelving unit manager 202 may select the unallocated portion that closely matches the first adjustable inventory slot to be the first portion to form the adjustable inventory slot. For example, the shelving unit manager 202 may select the unallocated portion with the smallest difference in slot width and/or slot height from the first adjustable inventory slot to be the first portion. In some embodiments, the unallocated portion having the slot width smaller than the slot width of the first adjustable inventory slot may not be selected. This is because the unallocated portion may be directly adjacent to existing adjustable inventory slots, and thus may not have additional horizontal space to expand. On the other hand, the unallocated portion having the slot height smaller than the slot height of the first adjustable inventory slot may still be selected. For example, the shelving unit manager 202 may determine an additional vertical space generated by vertically positioning the shelf including the unallocated portion and/or one or more shelves above or below the shelf including the unallocated portion. If the additional vertical space satisfies (e.g., larger than or equal to) the difference of slot height between the unallocated portion and the first adjustable inventory slot, the shelving unit manager 202 may select the unallocated portion to be the first portion.

In some embodiments, the shelving unit manager 202 may select the unallocated portion to minimize the relative distances between the unallocated portion and other inventory slots allocated to the inventory items in the same product category as the first item. In some embodiments, the shelving unit manager 202 may prioritize the unallocated portions that are not a portion of an empty shelf (e.g., not yet include any inventory slot). The shelving unit manager 202 may also consider other factors to select the first portion to form the first adjustable inventory slot.

Figure 11A:
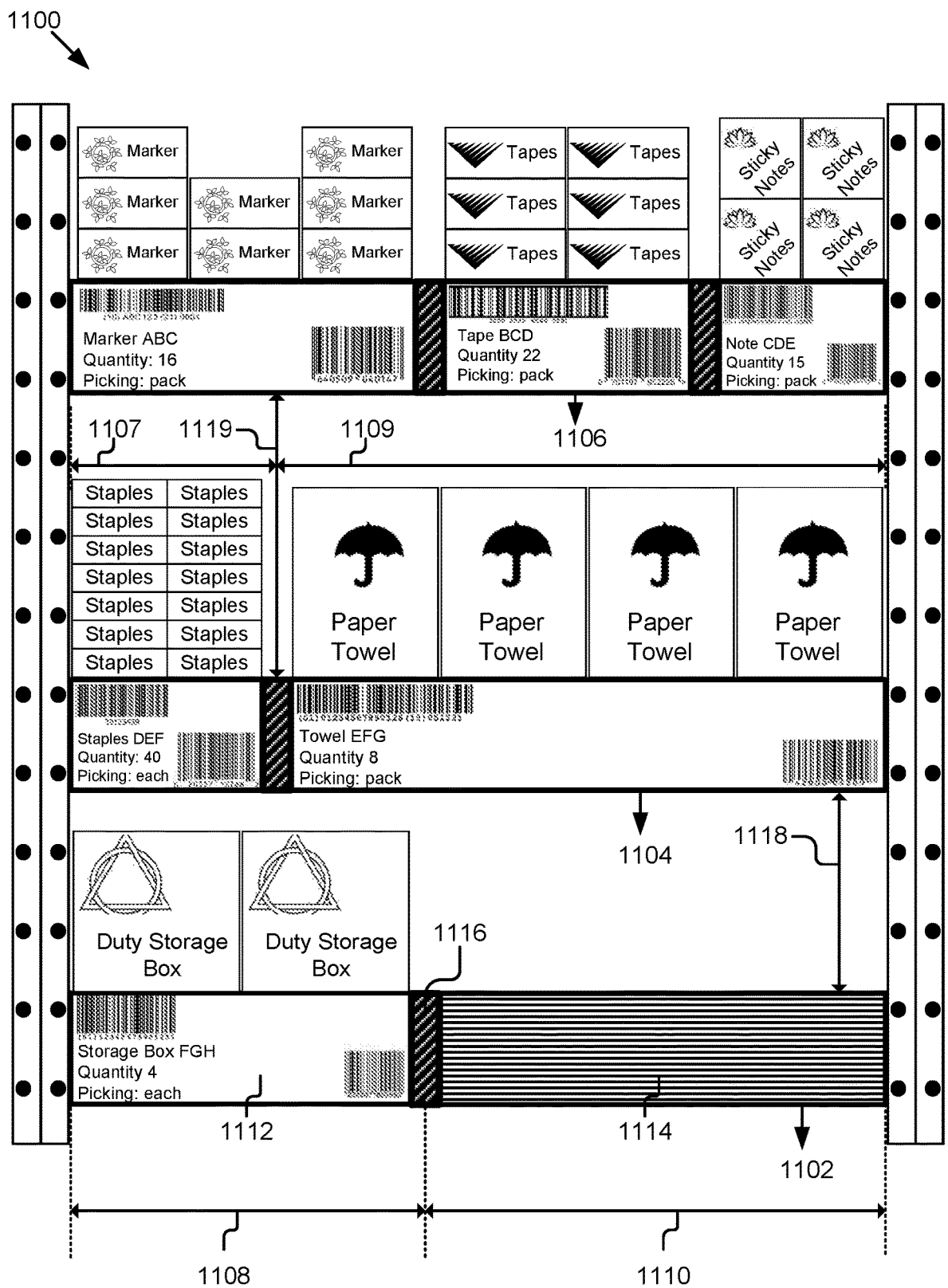
FIG. 11A illustrates another example of a shelving unit.

Referring back to FIG. 3, in block 306, the display controller 206 and the shelf controller 208 may adjust the first portion to form the first adjustable inventory slot using the slot width and the slot height of the first adjustable inventory slot. FIGS. 11A-11E illustrate an example of a shelving unit with a first portion of a shelf being adjusted to form the first adjustable inventory slot. As depicted in FIG. 11A, the shelving unit 1100 includes a shelf 1102, a shelf 1104, and a shelf 1108. The shelf 1102 may include an adjustable inventory slot 1108 and an unallocated portion 1110. The adjustable inventory slot 1108 may be indicated by a visual representation 1112, and the unallocated portion 1110 may be indicated by a visual representation 1114 displayed on the electronic display strip 121 extending parallel with the shelf 1102. The electronic display strip 121 may also display a slot indicator 1116 between the visual representation 1112 and the visual representation 1114.

As shown, the visual representation 1112 indicating the adjustable inventory slot 1108 may include information of the inventory item stocked in the adjustable inventory slot 1108 (e.g., duty storage box). The visual representation 1114 indicating the unallocated portion 1110 may include a predefined pattern for the shelf portion not yet allocated to any inventory item. In this example, assuming that the unallocated portion 1110 is selected to be the first portion 1110 of the shelf 1102 to form a first adjustable inventory slot for a first item (e.g., copy paper). The first portion 1110 may have a slot width indicated by the horizontal dimension of the visual representation 1114 (e.g., 150 cm) and a slot height indicated by the vertical distance 1118 between the shelf 1102 and the shelf 1104 (e.g., 40 cm). In this example, the first adjustable inventory slot for stocking the first item (e.g., 8 cases of copy paper) may have a slot width of 80 cm and a slot height of 50 cm.

Figure 6:
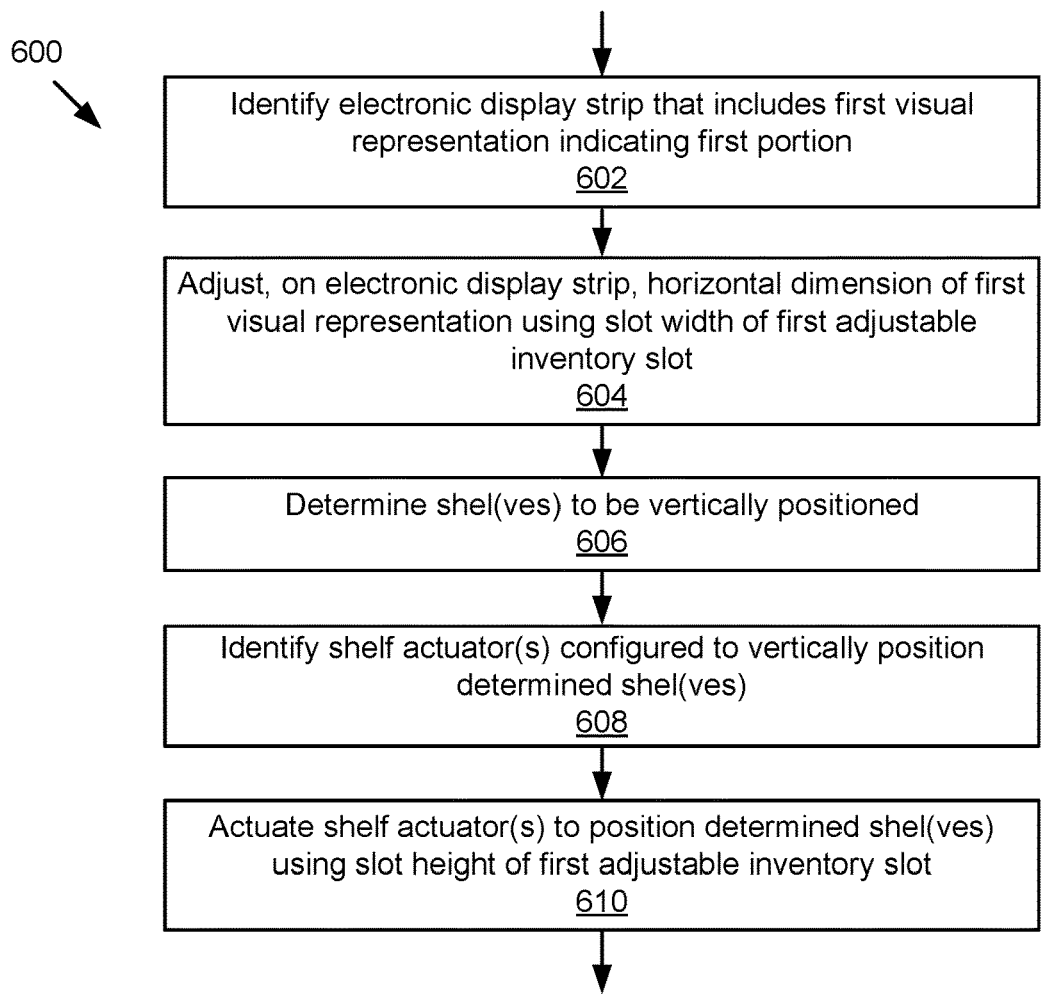
FIG. 6 is a flowchart of an example method for adjusting the unallocated portion of the shelf.

FIG. 6 illustrates a flowchart of an example method 600 for adjusting the first portion of the shelf In block 602, the display controller 206 may identify the electronic display strip that includes the first visual representation indicating the first portion. For example, the display controller 206 may use the shelf data associated with the shelf 1102 that includes the first portion 1110 to identify the strip ID of the electronic display strip 121 extending parallel with the shelf 1102. As discussed elsewhere herein, the strip ID may uniquely identify a particular electronic display strip among multiple electronic display strips equipped for the shelves of the shelving units in the storage facility.

Figure 11B:
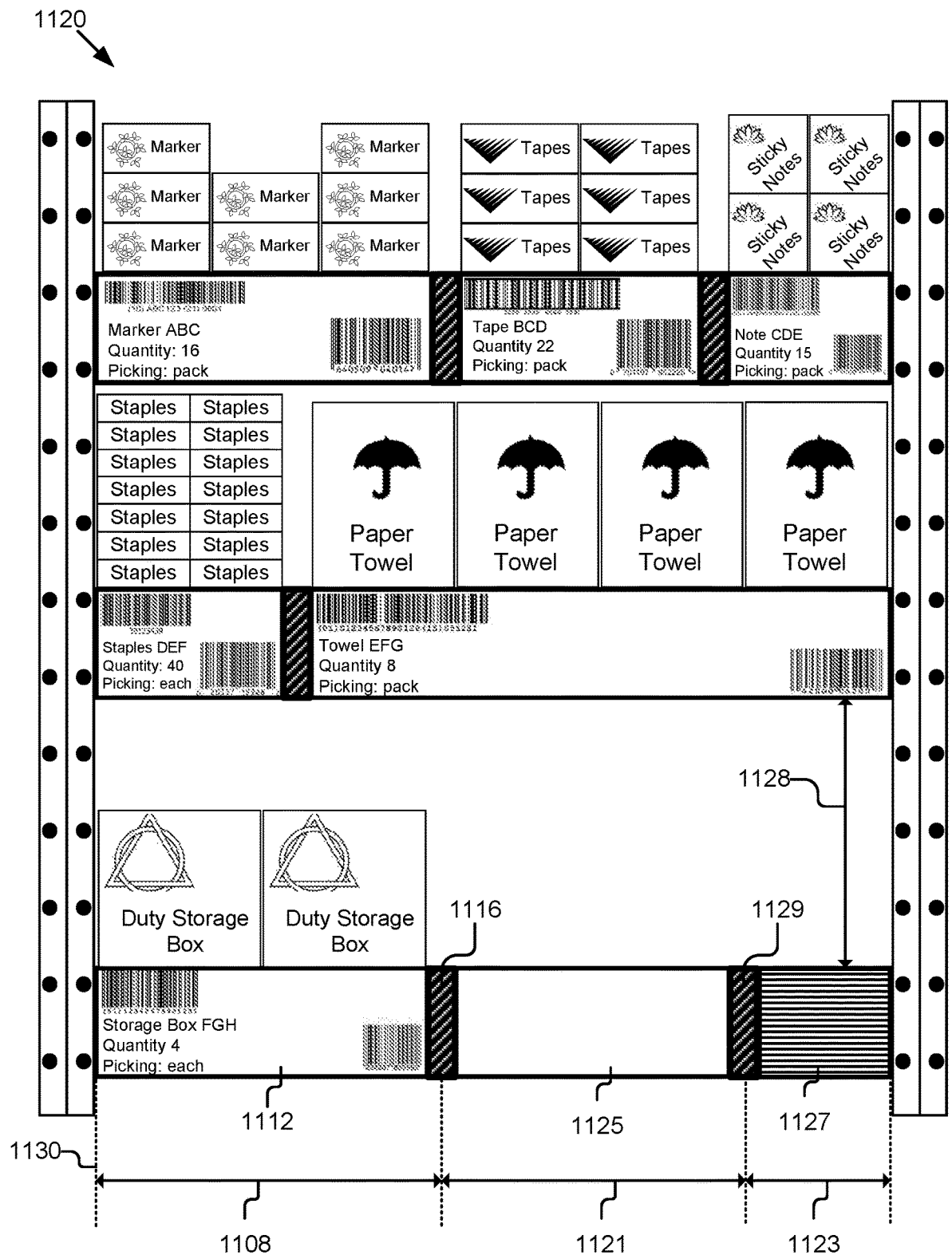
FIGS. 11B and 11C respectively illustrate the shelving unit when a first adjustable inventory slot is adjusted, and when the first adjustable inventory slot is allocated to a first item.

In block 604, the display controller 206 may adjust, on the electronic display strip, the horizontal dimension of the first visual representation using the slot width of the first adjustable inventory slot. For example, as depicted in FIGS. 11A and 11B, the display controller 206 may adjust the horizontal dimension of the visual representation 1114 on the electronic display strip 121 using the slot width of the first adjustable inventory slot (e.g., 80 cm). In particular, the display controller 206 may send an instruction to the electronic display strip 121 associated with the shelf 1102 via the network 103. The instruction may cause the electronic display strip 121 to adjust the horizontal dimension of the visual representation 1114 (e.g., 150 cm) to display a visual representation 1125 indicating a first adjustable inventory slot 1121, and a visual representation 1127 indicating an unallocated portion 1123, as illustrated in FIG. 11B. The horizontal dimension of the visual representation 1125 is the slot width of first adjustable inventory slot 1121 (e.g., 80 cm). The horizontal dimension of the visual representation 1127 is the horizontal dimension of the visual representation 1114 excluding the horizontal dimension of the visual representation 1125 (e.g., 70 cm). As depicted, the electronic display strip 121 may also display a slot indicator 1129 between the visual representation 1125 and the visual representation 1127.

In block 606, the shelving unit manager 202 may determine one or more shelves of the shelving unit to be vertically positioned to adjust the slot height of the first portion to form the first adjustable inventory slot. In some embodiments, the shelves to be vertically positioned may include the shelf that includes the first portion to be adjusted. In some embodiments, the shelves to be vertically positioned may include one or more shelves above or below the shelf that includes the first portion in the shelving unit.

In some embodiments, the shelving unit manager 202 may determine the candidate shelves in the shelving unit that are vertically adjustable. For each candidate shelf, the shelving unit manager 202 may determine the amount of vertical space occupied by inventory items stocked in the candidate shelf. The amount of occupied vertical space may be determined based on the quantity of inventory items currently stocked in each adjustable inventory slot of the candidate shelf and the arrangement pattern of these inventory items. The shelving unit manager 202 may also determine the vertical distances between the candidate shelf to the shelf above and below the candidate shelf in the shelving unit. By using the amount of occupied vertical space of each candidate shelf and the vertical distances from the candidate shelf to its directly adjacent shelves in the shelving unit, the shelving unit manager 202 may determine one or more shelves to be vertically positioned for adjusting the slot height of the first portion. The shelving unit manager 202 may also determine the moving direction, the moving distance, and the moving order for these vertically positioned shelves based on the slot height of the first adjustable inventory slot.

In the above example, the slot height of the first portion 1110 in the shelf 1102 needs to be adjusted from 40 cm to 50 cm to form the first adjustable inventory slot 1121. Thus, the slot height of the first portion 1110 needs to be increased with an additional vertical space of 10 cm. In this example, assuming that the top shelf 1106 and the bottom shelf 1102 are fixed but the middle shelf 1104 is vertically adjustable. Therefore, the shelf 1104 is determined as a candidate shelf. The shelving unit manager 202 may estimate the amount of occupied vertical space for the shelf 1104 (e.g., 45 cm) based on the arrangement pattern of staples in the adjustable inventory slot 1107 (e.g., 40 staples) and the arrangement pattern of paper towel packs in the adjustable inventory slot 1109 (e.g. 8 packs). The shelving unit manager 202 may also determine the vertical distance 1118 from the shelf 1104 to the shelf 1102 (e.g., 40 cm) and the vertical distance 1119 from the shelf 1104 to the shelf 1106 (e.g., 58 cm). The shelving unit manager 202 may therefore determine that there is an unoccupied vertical space of 13 cm between the shelf 1104 and the shelf 1106, and thus, the shelf 1104 may be vertically positioned to increase the slot height of the first portion 1110 in the shelf 1102 with the additional vertical space of 10 cm. For example, the shelving unit manager 202 may determine to vertically position the shelf 1104 towards the shelf 1106 with a moving distance of 10 cm. As a result, the vertical distance 1128 from the shelf 1104 to the shelf 1102 in increased from 40 cm to 50 cm as depicted in FIG. 11B. Therefore, the first portion 1110 in the shelf 1102 is adjusted to the slot height of the first adjustable inventory slot 1121 (e.g., 50 cm).

In block 608, the shelf controller 208 may identify the shelf actuators configured to vertically position the one or more shelves determined in block 606. For example, the shelf controller 208 may use the shelf data associated with the shelf 1104 to identify the actuator IDs of the shelf actuators 123 that can be actuated to vertically position the shelf 1104. As discussed elsewhere herein, the actuator ID may uniquely identify a particular shelf actuator among multiple shelf actuators equipped for the shelves of the shelving units in the storage facility.

In block 610, the shelf controller 208 may actuate the shelf actuators to vertically position the one or more shelves using the slot height of the first adjustable inventory slot. In particular, the shelf controller 208 may vertically position the one or more shelves using the moving direction, the moving distance, and the moving order determined based on the slot height of the first adjustable inventory slot as discussed above. For example, the shelf controller 208 may send an instruction to the shelf actuators 123 associated with the shelf 1104 via the network 103. The instruction may actuate the shelf actuators 123 to vertically move the shelf 1104 towards the shelf 1106 with the moving distance of 10 cm.

FIG. 11B illustrates the shelving unit 1120 with the first portion 1110 of the shelf 1102 adjusted to form the first adjustable inventory slot 1121. As depicted, the electronic display strip 121 extending parallel with the shelf 1102 displays the visual representation 1112 indicating the adjustable inventory slot 1108, the visual representation 1125 indicating the adjustable inventory slot 1121, and the visual representation 1117 indicating the unallocated portion 1123 of the shelf 1102. As discussed above, the horizontal dimension of the visual representation 1125 indicates the slot width of first adjustable inventory slot 1121 (e.g., 80 cm). The slot height of first adjustable inventory slot 1121 is adjusted to 50 cm by actuating the shelf actuators 123 to vertically position the shelf 1104 towards the shelf 1106.

In some embodiments, the shelving unit manager 202 may receive a notification of complete adjustment from the electronic display strip 121 and/or the shelf actuators 123. The shelving unit manager 202 may then update the shelf data and the slot data in the data store 119 according to the adjustment. For example, the shelving unit manager 202 may update the vertical distance to the shelf directly above in the shelf data of the shelf 1102 (e.g., 50 cm) and the shelf 1104 (e.g., 48 cm). The slot height of the adjustable inventory slots included in the shelf 1102 and the shelf 1104 may also be updated accordingly. As the adjustment of the unallocated portion 1110 results in the unallocated portion 1123 of the shelf 1102, the shelving unit manager 202 may update the slot data of the unallocated portion 1110 to reflect the unallocated portion 1123. The type of slot data to be updated may include the slot width (e.g., 70 cm), the slot height (e.g., 50 cm), and the distance from the start point of the unallocated portion to the point of reference associated with the shelf including the unallocated portion (e.g., the distance from the slot indicator 1129 to the first end 1130 of shelf 1102, e.g., 170 cm).

In some embodiments, the shelving unit manager 202 may aggregate the slot data for the first adjustable inventory slot 1121. For example, the shelving unit manager 202 may assign a new slot ID to the first adjustable inventory slot 1121. The slot data of the first adjustable inventory slot 1121 may include the assigned slot ID, the shelving location (the shelving unit ID of the shelving unit 1120, the shelf ID of the shelf 1102, the distance from the slot indicator 1116 indicating the start point of the first adjustable inventory slot 1121 to the first end 1130 of shelf 1102, e.g., 90 cm), the slot width (e.g., 80 cm), the slot height (e.g., 50 cm), the slot type (e.g., inventory slot), the accommodatable quantity of items (e.g., 8 cases of copy paper), the current quantity of items (e.g., 0 case), etc. of the first adjustable inventory slot 1121. The shelving unit manager 202 may store the slot data of the first adjustable inventory slot 1121 in the data store 119.

Figure 7:
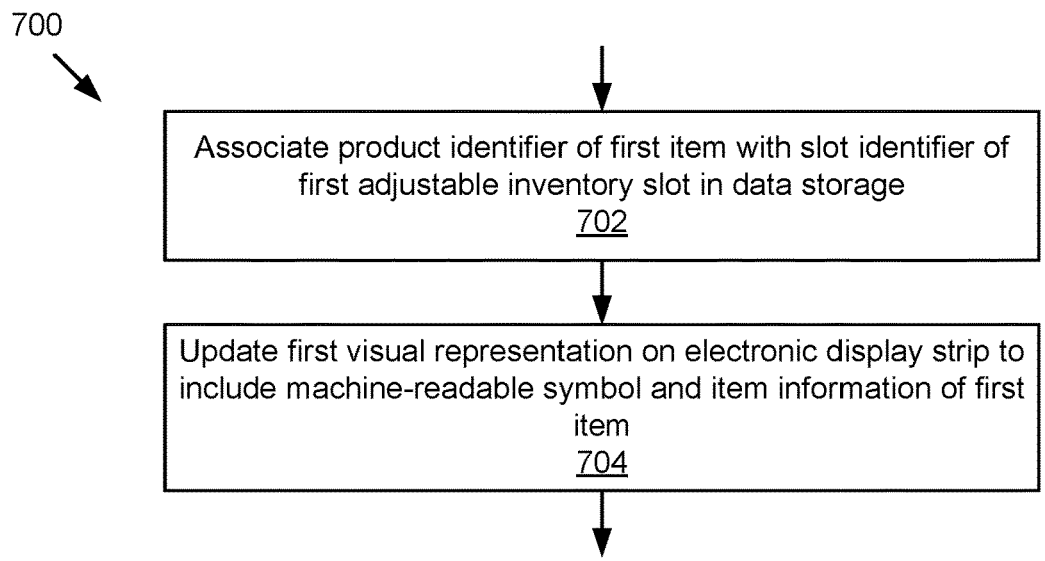
FIG. 7 is a flowchart of an example method for allocating the adjustable inventory slot to an item.

Referring back to FIG. 3, in block 308, the shelving unit manager 202 may allocate the first adjustable inventory slot to the first item. A flowchart of an example method 700 for allocating the first adjustable inventory slot to the first item is illustrated in FIG. 7. In block 702, the shelving unit manager 202 may associated product identifier of the first item with the slot identifier of the first adjustable inventory slot in the data storage. For example, the shelving unit manager 202 may associate the product ID of the copy paper GHJ to the slot ID of the first adjustable inventory slot 1121 in the data store 119.

In block 704, the display controller 206 may update the first visual representation indicating the first adjustable inventory slot on the electronic display strip to include a unique machine-readable symbol identifying the first item and item information describing the first item. In some embodiments, the display controller 206 may retrieve the item information of the first item from the data store 119. For example, the display controller 206 may retrieve the machine-readable symbol uniquely identifying the first item (e.g., product barcode), the item name (e.g., copy paper GHJ), the picking instruction (e.g., case), etc. from the product data of the first item in the data store 119. In some embodiments, the display controller 206 may also retrieve the slot information of the first adjustable inventory slot from the data store 119. For example, the display controller 206 may retrieve the machine-readable symbol uniquely identifying the first adjustable inventory slot (e.g., slot barcode), the shelving location, the first quantity of the first item to be stocked in the first adjustable inventory slot (e.g., 8 cases), etc. from the slot data of the first adjustable inventory slot in the data store 119.

In some embodiments, the display controller 206 may send an instruction to the electronic display strip 121 associated with the shelf that includes the first adjustable inventory slot. The instruction may include the item information of the first item and/or the slot information of the first adjustable inventory slot. The instruction may cause the electronic display strip 121 to determine the first visual representation indicating the first adjustable inventory slot on the electronic display strip 121 (e.g., using the shelving location of the first adjustable inventory slot), and update the first visual representation to include the item information of the first item and/or the slot information of the first adjustable inventory slot.

Figure 11C:
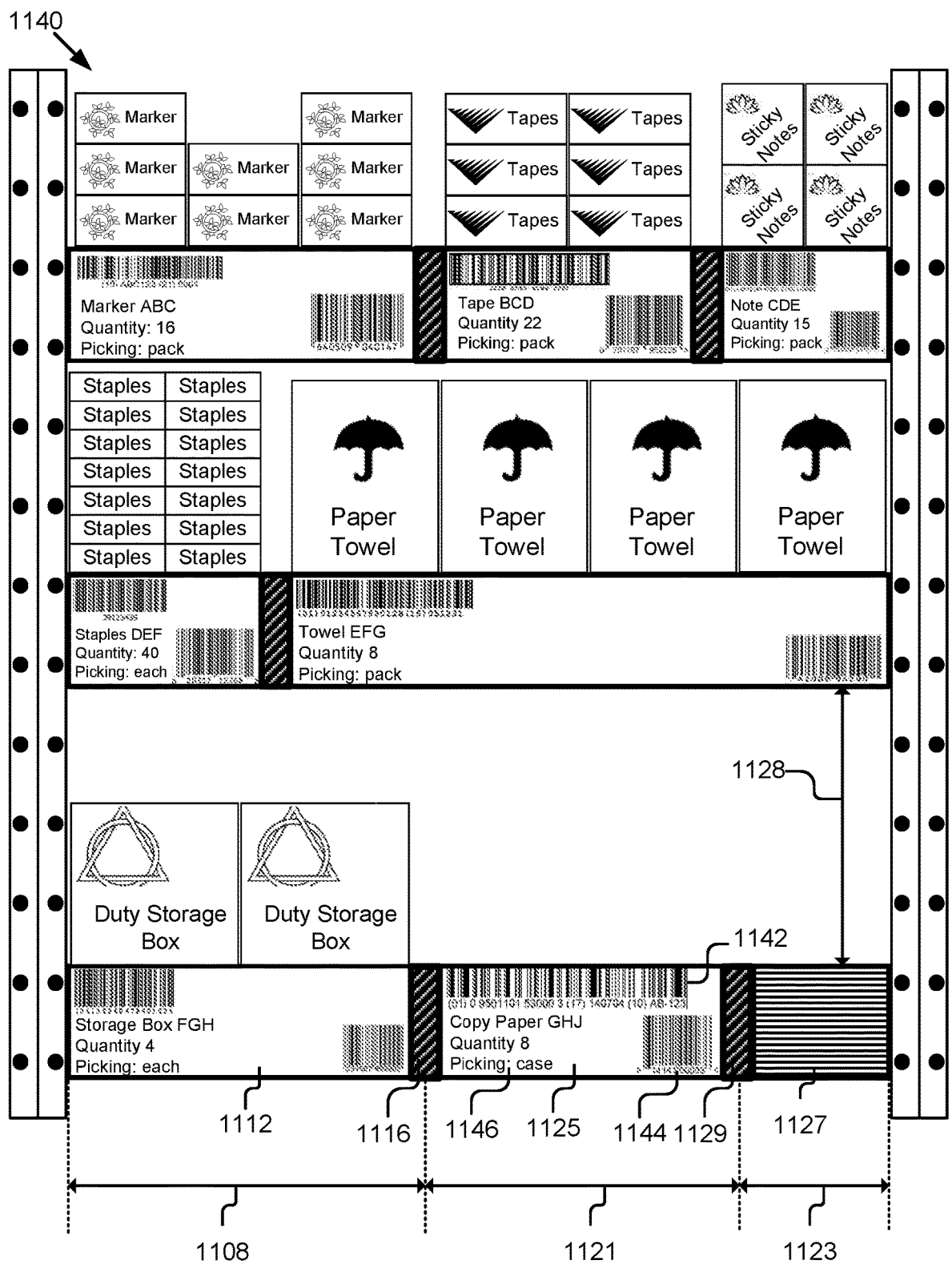

FIG. 11C illustrates the shelving unit 1140 with the first adjustable inventory slot 1121 allocated to the first item. In this example, the electronic display strip 121 extending parallel with the shelf 1102 may receive the item information of the first item (e.g., copy paper) and the slot information of the first adjustable inventory slot 1121 from the display controller 206 via the network 103. The electronic display strip 121 may use the shelving location of the first adjustable inventory slot 1121 (e.g., the distance from the start point of the first adjustable inventory slot 1121 represented by the slot indicator 1116 to the first end 1130 of the shelf 1102) to determine the first visual representation 1125 indicating the first adjustable inventory slot 1121. The electronic display strip 121 may update the first visual representation 1125 to include the item information of the first item and/or the slot information of the first adjustable inventory slot. As depicted, the first visual representation 1125 may include the product barcode 1142 of the first item and the item information 1146 of the first item (e.g., item name: "copy paper GHJ," quantity of items to be stocked in the adjustable inventory slot: "8," picking instruction: "case"). The first visual representation 1125 may also include the slot barcode 1144 of the first adjustable inventory slot 1121.

Figure 8:
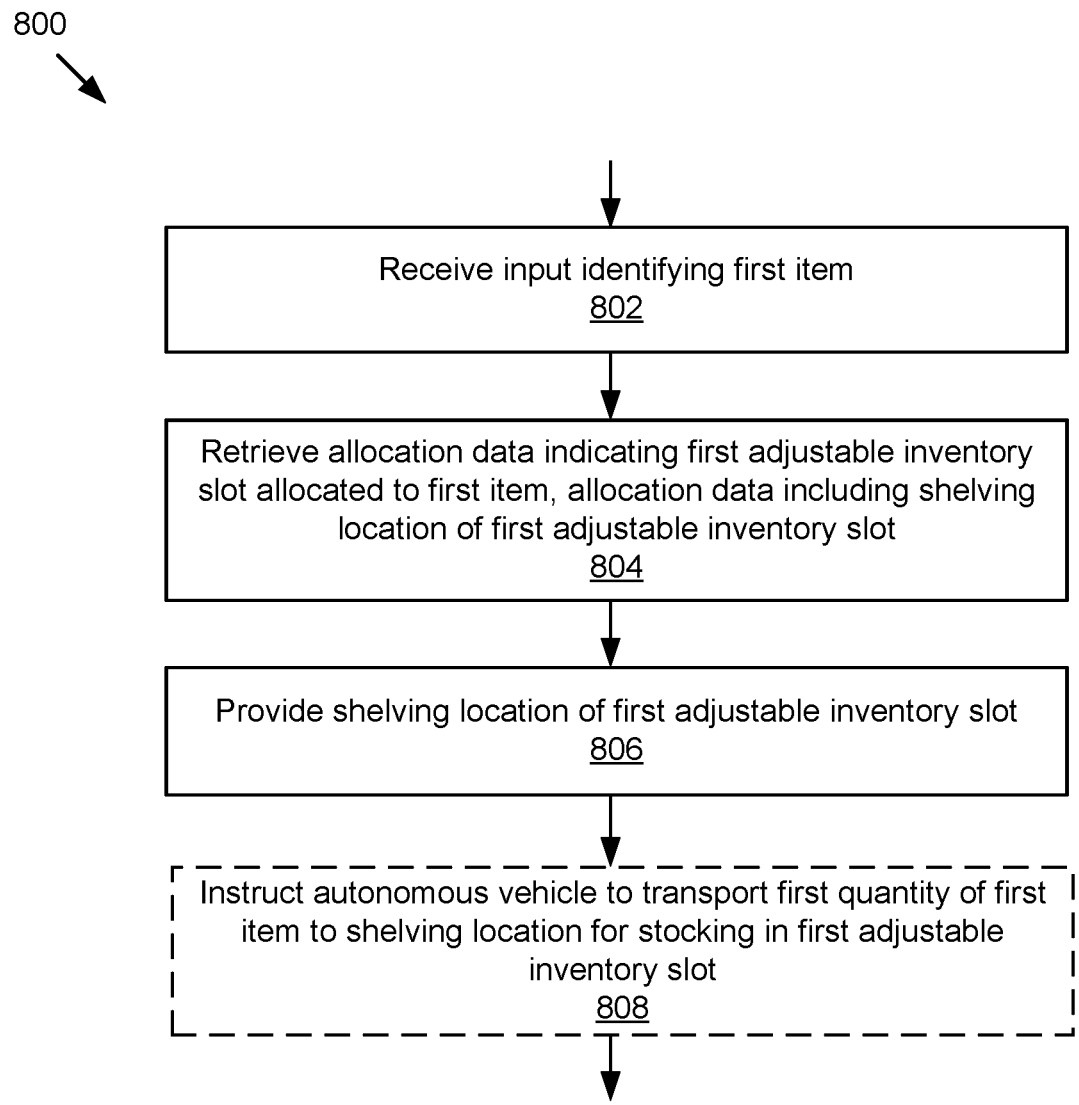
FIG. 8 is a flowchart of an example method for providing a shelving location of the adjustable inventory slot.

In some embodiments, the shelving unit managing application 1111 may adjust the first adjustable inventory slot and allocate the first adjustable inventory slot to the first item in advance. For example, the adjustment and the allocation of the first adjustable inventory slot may be automatically performed prior to the scheduled delivery date of the first item, thereby making the first adjustable inventory slot ready to stock the first quantity of the first item when it is delivered. FIG. 8 is a flowchart of an example method 800 for providing the shelving location of the first adjustable inventory slot. In block 802, the shelving unit manager 202 may receive an input identifying the first item. For example, when the first items are delivered at the receiving dock of the storage facility, the human worker 128 may use the assistance device 127 (e.g., barcode scanner) to collect and send the product ID of the first item to the shelving unit managing application 1111 via the network 103.

In block 804, the shelving unit manager 202 may retrieve the allocation data that indicates the first adjustable inventory slot allocated to the first item from the data storage. In particular, the shelving unit manager 202 may use the product ID of the first item to retrieve the slot ID of the first adjustable inventory slot that is associated with the product ID of the first item in the data store 119. In some embodiments, the allocation data may include the shelving location of the first adjustable inventory slot. In other embodiments, the shelving location may be retrieved from the slot data of the first adjustable inventory slot using the slot ID. As discussed elsewhere herein, the shelving location of the first adjustable inventory slot may indicate the location of the shelving unit that includes the shelf having the first adjustable inventory slot from among the plurality of shelves in the storage facility. For example, the shelving location may include the shelving unit ID and the shelf ID associated with the shelf including the first adjustable inventory slot. The shelving location may also include the slot ID of the first adjustable inventory slot and/or the distance from the start point of the first adjustable inventory slot to the point of reference associated with the shelf.

In block 806, the shelving unit manager 202 may provide the shelving location of the first adjustable inventory slot. For example, the shelving unit manager 202 may send the shelving location to the assistance device 127 to facilitate the task of stocking the first items in the first adjustable inventory slot. Other type of slot data may also be sent to the assistance device 127, such as the first quantity of the first item to be stocked in the first adjustable inventory slot, the arrangement pattern to place the first quantity of the first item in the first adjustable inventory slot, etc.

In some embodiments, the human worker 128 may use the shelving location provided via the assistance device 127 to navigate to the first adjustable inventory slot. For example, the human worker 128 may locate the first adjustable inventory slot 1121 included in the shelf 1102 based on the shelving unit ID, the shelf ID, and the slot ID (displayed as the slot barcode 1144) associated with the first adjustable inventory slot 1121. The human worker 128 may transport the first quantity of the first item to be stocked in the first adjustable inventory slot (e.g., 8 cases of copy paper GHJ) to the first adjustable inventory slot 1121 for stocking. In some embodiments, the human worker 128 may place the first quantity of the first item in the first adjustable inventory slot according to the arrangement pattern. As discussed elsewhere herein, the arrangement pattern may be determined when the slot width and the slot height of the first adjustable inventory slot are calculated and may be provided via the assistance device 127 to the human worker 128.

In some embodiments, the shelving location provided to the human worker 128 may only include the shelving unit ID and the shelf ID of the shelf 1102 that includes the first adjustable inventory slot 1121. As the human worker 128 navigates to the shelf 1102, the human worker 128 may look for the first adjustable inventory slot 1121 using the visual representations displayed on the electronic display strip 121 extending parallel with the shelf 1102. For example, the first adjustable inventory slot 1121 allocated to the first item may be identified based on the item information 1146 (e.g., item name and accommodatable quantity of items) and/or the product barcode 1142 included in the first visual representation 1125 among multiple visual representations displayed on the electronic display strip 121.

In some embodiments, as the shelving unit manager 202 sends the shelving location of the first adjustable inventory slot 1121 to the assistance device 127, the display controller 206 may also send an instruction to the electronic display strip 121 extending along the shelf 1102 that includes the first adjustable inventory slot 1121. The instruction may cause the electronic display strip 121 to highlight the first visual representation 1125 indicating the first adjustable inventory slot 1121 (e.g., brighten up, blinking, etc.) to help the human worker 128 identify the first adjustable inventory slot 1121 quickly. The highlight effect may be terminated manually by the human worker 128 using manual controls of the electronic display strip 121. Alternatively, the display controller 206 may send another instruction to the electronic display strip 121 to automatically terminate the highlight effect as the shelving unit managing application 1111 receives a notification of complete stocking. In some embodiments, the notification of complete stocking may be sent from the assistance device 127 by the human worker 128.

In some embodiments, the task of stocking the first quantity of the first item into the first adjustable inventory slot may be performed by an autonomous vehicle rather than the human worker 128. The autonomous vehicle may be any robotic device capable of performing one or more warehouse tasks, e.g., transporting inventory items, stocking and picking the inventory items to and from the inventory slots, packing inventory items into containers, etc. Examples of the autonomous vehicle include, but are not limited to, warehouse robotic devices, mobile robots, robotic arms, etc.

In block 808, the shelving unit manager 202 may instruct the autonomous vehicle to transport the first quantity of the first item to the shelving location for stocking in the first adjustable inventory slot. The block 808 may be performed with the implementation of autonomous vehicles in the storage facility, and thus is indicated as optional. In some embodiments, each shelving unit and each shelf in the storage facility may include a machine-readable symbol (e.g., barcode, QR code, etc.) representing the shelving unit ID and the shelf ID. Each visual representation indicating the adjustable inventory slot on the electronic display strip may also include a machine-readable symbol representing the slot ID (e.g., the slot barcode 1144). The autonomous vehicle may be guided within the storage facility using these machine-readable symbols. In some embodiments, the shelving unit manager 202 may provide the autonomous vehicle with the shelving location of the first adjustable inventory slot 1121 (e.g., the shelving unit ID, the shelf ID, and the slot ID). The autonomous vehicle may use the shelving unit ID, the shelf ID, and the slot ID to navigate to the first adjustable inventory slot 1121 based on the machine-readable symbols.

In some embodiments, the shelving location of the first adjustable inventory slot 1121 provided to the autonomous vehicle may include the shelving unit ID of the shelving unit 1140, the shelf height (from the ground) of the shelf 1102, and the distance from the start point of the first adjustable inventory slot 1121 (represented by the slot indicator 1116) to the first end 1130 of the shelf 1102. For example, the shelving unit manager 202 may retrieve the shelf height of the shelf 1102 (e.g., 10 cm) from the shelf data of the shelf 1102, and retrieve the distance from the start point of the first adjustable inventory slot 1121 to the first end 1130 of the shelf 1102 (e.g., 90 cm) from the slot data of the first adjustable inventory slot 1121. In these embodiments, the autonomous vehicle may navigate to the shelving unit 1140 using the shelving unit ID. The autonomous vehicle may then vertically raise or lower to the shelf height of the shelf 1102 (e.g., 10 cm), and horizontally move to the start point of the first adjustable inventory slot 1121, e.g., using the distance from the start point of the first adjustable inventory slot 1121 to the first end 1130 of the shelf 1102 (e.g., 90 cm). Alternatively, the autonomous vehicle may horizontally move to the start point of the first adjustable inventory slot 1121, and then vertically elevate or descend to the shelf height of the shelf 1102.

Figure 11D:
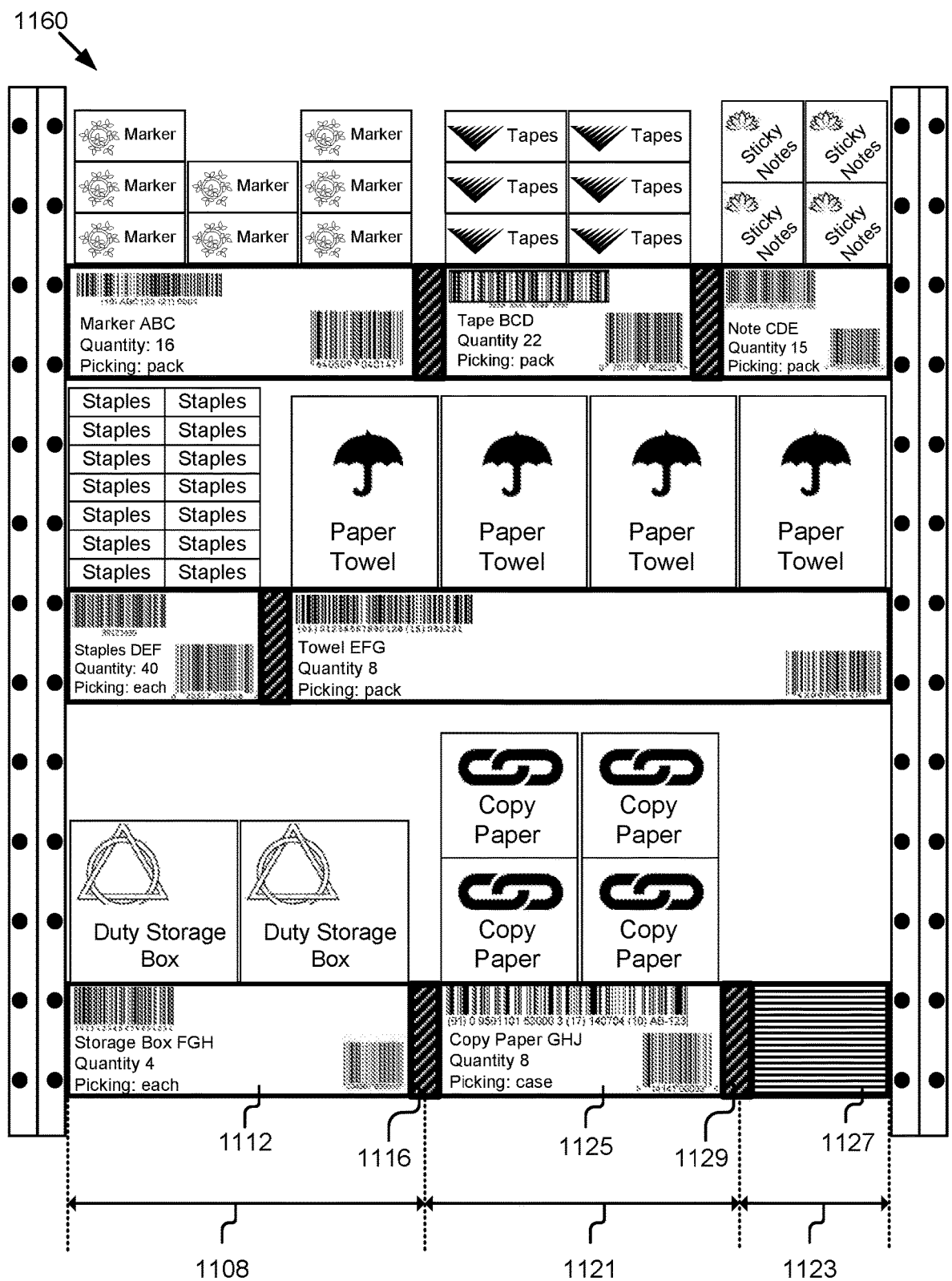
FIGS. 11D and 11E respectively illustrate the shelving unit when the first item is stocked in the first allocated adjustable inventory slot, and when a second item is stocked in a second adjustable inventory slot included in the shelf.

In some embodiments, the autonomous vehicle may transport the first quantity of the first item to the first adjustable inventory slot 1121 for stocking. As the autonomous vehicle reaches the first adjustable inventory slot 1121, the shelving unit manager 202 may instruct the autonomous vehicle to place the first quantity of the first item in the first adjustable inventory slot 1121, e.g., according to the arrangement pattern discussed elsewhere herein. FIG. 11D illustrates the shelving unit 1160 with the first adjustable inventory slot 1121 stocked with the first items. As depicted, 8 cases of copy paper GHJ are stocked in the first adjustable inventory slot 1121. In this example, 8 cases of copy paper may be organized according to the arrangement pattern to form a cube of 2×2×2 copy paper cases.

In some embodiments, the shelving unit managing application 111 may continuously readjust the adjustable inventory slots over time to optimize the space utilization in the storage facility. For example, if the quantity of the inventory item stocked in a particular adjustable inventory slot is frequently lower than its accommodatable quantity of the inventory item, the shelving unit managing application 111 may automatically reduce the slot size of that adjustable inventory slot. In another example, if the inventory item stocked in an adjustable inventory slot frequently needs to be replenished, the shelving unit managing application 111 may automatically increase the slot size of that adjustable inventory slot. In some embodiments, the shelving unit managing application 111 may readjust the adjustable inventory slots of the shelving units in the storage facility periodically (e.g., every 2 weeks), or when the computing resources are available.

Figure 9:
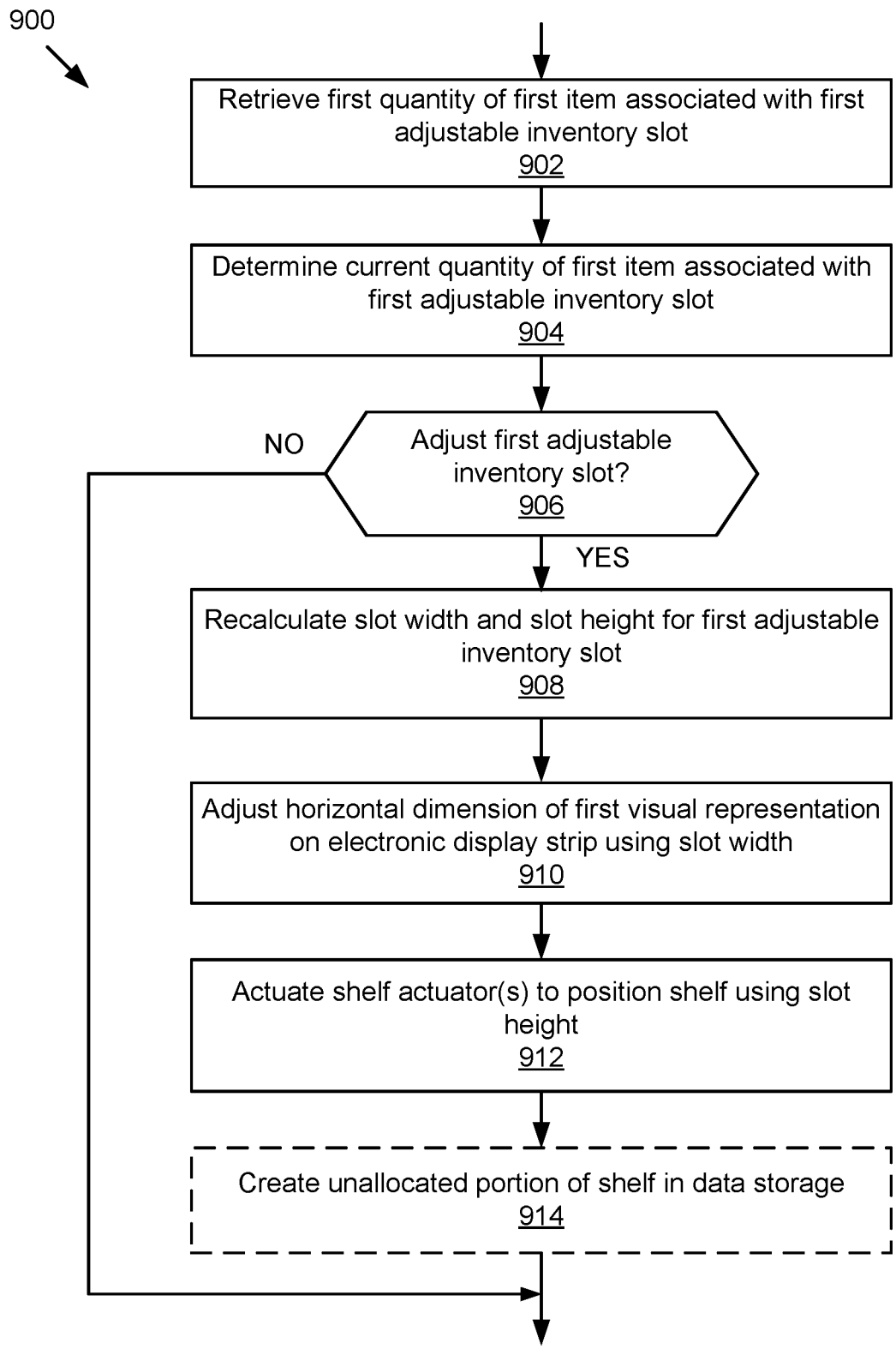
FIG. 9 is a flowchart of an example method for readjusting the adjustable inventory slot

A flowchart of an example method 900 for readjusting the first adjustable inventory slot is illustrated in FIG. 9. In block 902, the shelving unit manager 202 may retrieve the accommodatable quantity of the first item associated with the first adjustable inventory slot. As discussed elsewhere herein, the accommodatable quantity of the first item is the quantity of the first item that can be sufficiently accommodated by the first adjustable inventory slot. In block 904, the shelving unit manager 202 may determine the current quantity of the first item associated with the first adjustable inventory slot. For example, the shelving unit manager 202 may update the quantity of the first item currently stocked in the first adjustable inventory slot each time a variation quantity of the first item is added to the first adjustable inventory slot (e.g., in the replenishing process) or removed from the first adjustable inventory slot (e.g., in the picking process).

In block 906, the shelving unit manager 202 may determine whether to readjust the first adjustable inventory slot. In some embodiments, if the current quantity of the first item stocked in the first adjustable inventory slot satisfies a threshold value for a predetermined period of time, the shelving unit manager 202 may determine to readjust the first adjustable inventory slot. For example, if the current quantity of the first item remains less than 50% of the accommodatable quantity of the first item in 3 months, the shelving unit manager 202 may determine to decrease the slot size of the first adjustable inventory slot. In some embodiments, the shelving unit manager 202 may determine whether to readjust the first adjustable inventory slot based on the product plan of the first item. For example, the shelving unit manager 202 may determine to increase the slot size of the first adjustable inventory slot if an expansion of supply is planned for the first item due to customer demand. The shelving unit manager 202 may determine to decrease the slot size of the first adjustable inventory slot if the first item is planned to be discontinued.

In some embodiments, the slot calculator 204 may determine an arrangement pattern to place the current quantity of the first item in the first adjustable inventory slot. If the current quantity of the first item can be organized in a more efficient manner (e.g., stacking up to make use of the slot height and reduce the slot width of the first adjustable inventory slot), the slot calculator 204 may send a signal to the shelving unit manager 202 indicating that the first adjustable inventory slot can be optimally resized. The shelving unit manager 202 may therefore determine to readjust the first adjustable inventory slot.

In the above examples, the slot size of the first adjustable inventory slot may be increased or decreased. In some embodiments, the shelving unit manager 202 may determine to increase the slot size of the first adjustable inventory slot only if the first adjustable inventory slot has additional horizontal space and/or additional vertical space to expand. For example, the first adjustable inventory slot may be directly adjacent to an unallocated portion of the shelf, or directly adjacent to another adjustable inventory slot that can be reduced in slot width. In another example, there may be vertical space for the shelf including the first adjustable inventory slot to move downwards, or for the shelf directly above the shelf including the first adjustable inventory slot to move upwards. As a result, the slot width and/or the slot height of the first adjustable inventory slot can be increased.

If the shelving unit manager 202 determines to readjust the first adjustable inventory slot, the method 900 proceeds to block 908. In block 908, the slot calculator 204 may recalculate the slot width and the slot height for the first adjustable inventory slot, e.g., based on the current quantity of the first item stocked in the first adjustable inventory slot. In block 910, the display controller 206 may adjust the horizontal dimension of the first visual representation indicating the first adjustable inventory slot on the electronic display strip. As discussed elsewhere herein, the electronic display strip may extend parallel with the shelf including the first adjustable inventory slot. The horizontal dimension of the first visual representation displayed on the electronic display strip may be adjusted to the position corresponding to the recalculated slot width of the first adjustable inventory slot. In block 912, the shelf controller 208 may actuate one or more shelf actuators configured to vertically position the shelf that includes the first adjustable inventory slot. In particular, the shelf including the first adjustable inventory slot may be vertically adjusted to the position corresponding to the recalculated slot height of the first adjustable inventory slot. The operations of the slot calculator 204, the display controller 206, and the shelf controller 208 are discussed in details elsewhere herein, and thus their descriptions are not repeated.

In block 914, the shelving unit manager 202 may create an unallocated portion of the shelf in the data storage. A new unallocated portion may be formed on the shelf because the slot width of the first adjustable inventory slot is decreased, but may not be formed by other adjustments to the first adjustable inventory slot. The block 914 is therefore indicated as optional. In some embodiments, the shelving unit manager 202 may aggregate the slot data for the unallocated portion. For example, the shelving unit manager 202 may assign a new slot ID to the unallocated portion. The slot data of the unallocated portion may include the assigned slot ID, the shelving location (the shelving unit ID and the shelf ID of the shelf including the unallocated portion, the distance from the start point of the unallocated portion to the point of reference associated with the shelf), the slot width (e.g., the difference between the slot width and the recalculated slot width of the first adjustable inventory slot), the slot height (e.g., the slot height or the recalculated slot height of the first adjustable inventory slot), the slot type (e.g., unallocated portion), etc. of the unallocated portion. In some embodiments, the shelving unit manager 202 may store the slot data of the unallocated portion in the data store 119. The display controller 206 may also update the first visual representation associated with the first adjustable inventory slot on the corresponding electronic display strip to indicate the unallocated portion with the predefined pattern for unallocated portion. As the unallocated portion is stored as one of multiple unallocated portions of the shelves, the unallocated portion may be selected from these multiple unallocated portions to form an adjustable inventory slot.

Figure 11E:
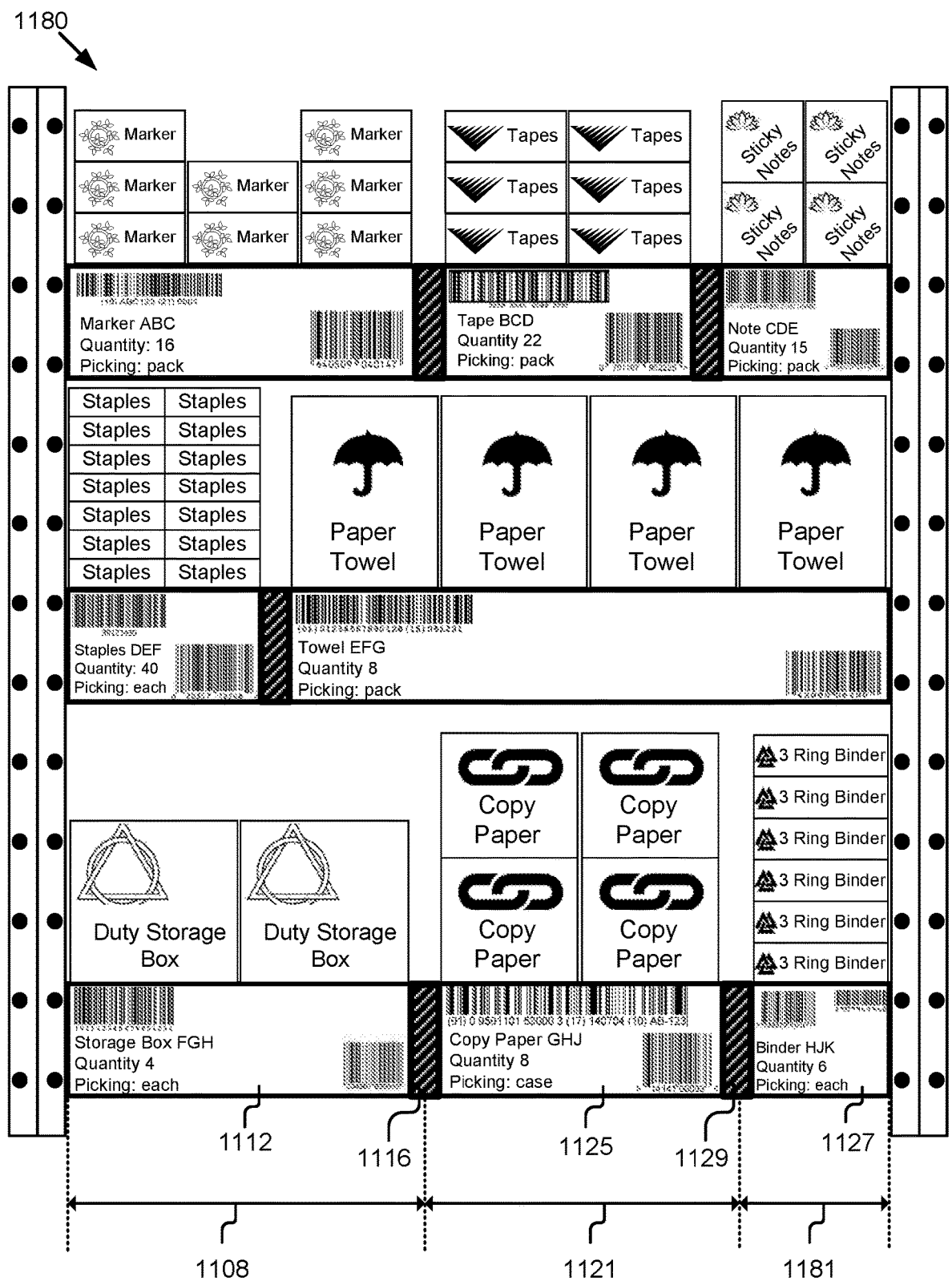

It should be understood that in some situations, the unallocated portion may have the slot width and the slot height sufficient to accommodate the quantity of inventory item to be stocked in the adjustable inventory slot, and thus may be used to form the adjustable inventory slot without adjustment. FIG. 11E illustrates the shelving unit 1180 in which the unallocated portion 1123 may not need to be adjusted to form a second adjustable inventory slot 1181. As depicted, the second adjustable inventory slot 1181 may have the same slot with and the slot height as the unallocated portion 1123. The second adjustable inventory slot 1181 may be allocated to a second item (e.g., 3 ring binder HJK). As illustrated, the visual representation 1127 indicating the unallocated portion 1123 on the electronic display strip 121 may be updated to include the slot barcode of the second adjustable inventory slot 1181, the product barcode and other item information of the second item.

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A system, comprising: a shelving unit including a shelf; and
a shelf adjustment system including an electronic display strip extending parallel with the shelf of the shelving unit, the electronic display strip displaying a first visual representation of a first adjustable inventory slot horizontally adjacent to a second visual representation of a second adjustable inventory slot, the first visual representation indicating a first portion of the shelf as the first adjustable inventory slot for a first item, a dimension of the first visual representation matching indicating a first dimension of the shelf allocated to stock the first item, and the second visual representation indicating a second portion of the shelf as the second adjustable inventory slot for a second item, a dimension of the second visual representation matching indicating a second dimension of the shelf allocated to stock the second item.

2. The system of claim 1, wherein the electronic display strip extends from a first point proximate to a first end of the shelf to a second point proximate to a second end of the shelf; the first visual representation extends from a first end of the first adjustable inventory slot to a second end of the first adjustable inventory slot; and the second visual representation extends from a first end of the second adjustable inventory slot to a second end of the second adjustable inventory slot.

3. The system of claim 1, further comprising:
an inventory control system electronically coupled to the electronic display strip that adjusts, on the electronic display strip, one or more of a horizontal dimension of the first visual representation to adjust a slot width of the first adjustable inventory slot and a horizontal dimension of the second visual representation to adjust a slot width of the second adjustable inventory slot.

4. The system of claim 3, wherein
the shelf adjustment system includes one or more shelf actuators configured to vertically position the shelf of the shelving unit;
the inventory control system is electronically coupled to the one or more shelf actuators; and
the inventory control system actuates the one or more shelf actuators to vertically position the shelf using a slot height of the first adjustable inventory slot and the second adjustable inventory slot.

5. The system of claim 3, further comprising:
a data storage communicatively coupled to the inventory control system for storing data and providing access to the data to the inventory control system, wherein the inventory control system is operable to:
determine a first quantity of the first item to be stocked in the first adjustable inventory slot and a second quantity of the second item to be stocked in the second adjustable inventory slot;
determine first item dimensions of the first item and second item dimensions of the second item;
calculate a slot width and a slot height for the first adjustable inventory slot based on the first quantity of the first item and the first item dimensions; calculate a slot width and a slot height for the second adjustable inventory slot based on the second quantity of the second item and the second item dimensions; and
store, in the data storage, the slot width and the slot height of the first adjustable inventory slot and the slot width and the slot height of the second adjustable inventory slot.

6. The system of claim 5, wherein the inventory control system is operable to:
allocate the first adjustable inventory slot to the first item in the data storage; and
allocate the second adjustable inventory slot to the second item in the data storage.

7. The system of claim 6, wherein
to allocate the first adjustable inventory slot to the first item in the data storage includes associating a product identifier of the first item with a slot identifier of the first adjustable inventory slot; and
to allocate the second adjustable inventory slot to the second item in the data storage includes associating a product identifier of the second item with a slot identifier of the second adjustable inventory slot.

8. The system of claim 6, wherein the inventory control system is operable to:
receive an input that identifies the first item;
retrieve, from the data storage, allocation data indicating the first adjustable inventory slot allocated to the first item, the allocation data including a shelving location indicating a location of the shelving unit that includes the shelf having the first adjustable inventory slot from among a plurality of shelves in a storage facility; and
provide the shelving location indicating the location of the shelving unit that includes the shelf having the first adjustable inventory slot.

9. The system of claim 6, wherein the inventory control system is operable to:
receive an input that identifies the first item;
retrieve, from the data storage, allocation data indicating the first adjustable inventory slot allocated to the first item, the allocation data including a shelving location indicating a location of the shelving unit that includes the shelf having the first adjustable inventory slot from among a plurality of shelves in a storage facility; and
instruct an autonomous vehicle to transport the first quantity of the first item to the shelving location for stocking in the first adjustable inventory slot represented by the first visual representation on the electronic display strip.

10. The system of claim 5, wherein the inventory control system is operable to:
update the first visual representation displayed on the electronic display strip to include a unique machine-readable symbol identifying the first item and item information describing the first item.

11. The system of claim 10, wherein the item information describing the first item displayed by the first visual representation on the electronic display strip includes one or more of an item name of the first item, a picking instruction of the first item, and the first quantity of the first item to be stocked in the first adjustable inventory slot.

12. The system of claim 4, further comprising a second shelf that has a second electronic display strip extending parallel with the second shelf and one or more second shelf actuators configured to vertically position the second shelf, wherein
the shelf includes a first unallocated portion indicated by a third visual representation on the electronic display strip;
the second shelf includes a second unallocated portion indicated by a fourth visual representation on the second electronic display strip; and
the inventory control system is operable to:
determine a third quantity of a third item to be stocked in a third adjustable inventory slot and third item dimensions of the third item; calculate a slot width and a slot height for the third adjustable inventory slot based on the third quantity of the first item and the third item dimensions; and
select, from the first unallocated portion and the second unallocated portion, a third portion to form the third adjustable inventory slot based on the slot width and the slot height of the third adjustable inventory slot.

13. The system of claim 12, wherein the inventory control system is operable to:
adjust, on the corresponding electronic display strip, a horizontal dimension of the corresponding visual representation that indicates the third portion using the slot width of the third adjustable inventory slot; and
actuate the one or more corresponding shelf actuators to vertically position the corresponding shelf that includes the third portion using the slot height of the third adjustable inventory slot.

* * * * *